United States Patent
Bach et al.

(10) Patent No.: US 10,895,754 B2
(45) Date of Patent: Jan. 19, 2021

(54) OPTICAL SYSTEM FOR IMAGING AN OBJECT

(71) Applicants: Carl Zeiss Sports Optics GmbH, Wetzlar (DE); Carl Zeiss Meditec AG, Jena (DE)

(72) Inventors: Christian Bach, Buseck (DE); Erhard Mutz, Waldsolms (DE); Christof Heintz, Oberursel (DE); Jörg Reinhardt, Erfurt (DE)

(73) Assignees: CARL ZEISS MEDITEC AG, Jena (DE); CARL ZEISS AG, Oberkochen (DE)

( * ) Notice: Subject to any disclaimer, the term of this patent is extended or adjusted under 35 U.S.C. 154(b) by 298 days.

(21) Appl. No.: 14/372,124

(22) PCT Filed: Jan. 9, 2013

(86) PCT No.: PCT/EP2013/050279
§ 371 (c)(1),
(2) Date: Jul. 14, 2014

(87) PCT Pub. No.: WO2013/104654
PCT Pub. Date: Jul. 18, 2013

(65) Prior Publication Data
US 2015/0054936 A1 Feb. 26, 2015

Related U.S. Application Data

(60) Provisional application No. 61/586,262, filed on Jan. 13, 2012.

(30) Foreign Application Priority Data

Jan. 13, 2012 (DE) .................. 10 2012 200 521

(51) Int. Cl.
G02B 27/64 (2006.01)
H04N 5/232 (2006.01)
(Continued)

(52) U.S. Cl.
CPC .......... G02B 27/646 (2013.01); G02B 23/18 (2013.01); H04N 5/23287 (2013.01); *G02B 23/02* (2013.01)

(58) Field of Classification Search
CPC ...... G02B 27/646; G02B 23/18; G02B 23/02; G02B 27/64; H04N 5/23287
See application file for complete search history.

(56) References Cited

U.S. PATENT DOCUMENTS 3,504,957 A 4/1970 Heflinger et al.
4,318,584 A * 3/1982 Ando .................. G02B 27/646
359/401

(Continued)

FOREIGN PATENT DOCUMENTS

DE 23 53 101 C3 5/1974
DE 39 33 255 C2 5/1991
(Continued)

OTHER PUBLICATIONS

Fujifilm Europe, "Techno-Stabi 14×40," <<URL:http://www.fujifilm.eu/eu/products/optical- devices/binoculars/p/techno-stabi-14x_40-1/#specifications>>, XP-002694004, Mar. 7, 2013. 1 p.
(Continued)

*Primary Examiner* — Jamie J Atala
*Assistant Examiner* — Patrick E Demosky
(74) *Attorney, Agent, or Firm* — Muirhead and Saturnelli, LLC

(57) ABSTRACT

A system described herein includes a first lens, a first image stabilization unit and a first image plane. When seen from the first lens in the direction of the first image plane, the
(Continued)

order in which the elements are arranged along a first optical axis is as follows: first lens, first image stabilization unit and first image plane. The first image stabilization unit has at least one first inlet surface and at least one first outlet surface. The first inlet surface is oriented towards the first lens. The first outlet surface is oriented towards the first image plane. Furthermore, the first outlet surface is spaced apart from the first image plane in a range of 1 mm to 20 mm.

24 Claims, 11 Drawing Sheets

(51) Int. Cl.
*G02B 23/18* (2006.01)
*G02B 7/12* (2006.01)
*G02B 23/02* (2006.01)

(56) References Cited

U.S. PATENT DOCUMENTS

| | | | | |
|---|---|---|---|---|
| 4,417,788 | A * | 11/1983 | Alvarez | G02B 27/644 250/201.1 |
| 4,465,346 | A | 8/1984 | Fraser | |
| 5,089,911 | A * | 2/1992 | Weyrauch | G02B 27/646 359/407 |
| 5,539,575 | A * | 7/1996 | Kakizawa | G02B 27/646 359/554 |
| 5,581,399 | A * | 12/1996 | Abe | G02B 23/18 359/407 |
| 5,583,597 | A | 12/1996 | Enomoto | |
| 5,598,296 | A | 1/1997 | Imaizumi | |
| 5,672,862 | A * | 9/1997 | Ohara | G02B 27/646 250/204 |
| 5,798,863 | A * | 8/1998 | Udagawa | G02B 27/646 359/554 |
| 5,910,859 | A | 6/1999 | Takahashi et al. | |
| 6,016,221 | A | 1/2000 | Kaneda et al. | |
| 6,067,194 | A * | 5/2000 | Stroemberg | G02B 23/18 359/407 |
| 6,128,442 | A | 10/2000 | Enomoto | |
| 6,377,399 | B1 * | 4/2002 | Yanari | G02B 27/646 359/407 |
| 6,414,793 | B1 * | 7/2002 | Ishijima | G02B 27/646 348/E5.046 |
| 7,460,154 | B2 | 12/2008 | Kawahara | |
| 2002/0093739 | A1 | 7/2002 | Ishijima et al. | |
| 2003/0128426 | A1 * | 7/2003 | Hammond | G02B 23/02 359/407 |
| 2004/0136068 | A1 | 7/2004 | Haga | |
| 2005/0128308 | A1 * | 6/2005 | Tholl | G02B 27/648 348/208.7 |
| 2006/0228097 | A1 | 10/2006 | Higurashi | |
| 2007/0019294 | A1 | 1/2007 | Baumann et al. | |
| 2007/0097516 | A1 * | 5/2007 | Ohtake | G02B 27/646 359/687 |
| 2009/0040612 | A1 | 2/2009 | Ota | |

FOREIGN PATENT DOCUMENTS

| | | |
|---|---|---|
| DE | 199 37 775 A1 | 2/2000 |
| DE | 694 23 430 T2 | 9/2000 |
| DE | 694 26 246 T2 | 3/2001 |
| DE | 697 20 902 T2 | 11/2003 |
| DE | 10 2004 001 349 A1 | 7/2004 |
| DE | 10 2005 027 870 A1 | 12/2006 |
| EP | 0 656 725 B1 | 3/2000 |
| EP | 0 636 916 B1 | 11/2000 |
| EP | 0 834 761 B1 | 4/2003 |
| EP | 1 538 472 A1 | 6/2005 |
| EP | 1 708 019 A2 | 10/2006 |
| EP | 1 087 249 B1 | 10/2007 |
| GB | 1 549 824 | 8/1979 |
| JP | 11352535 A | 12/1999 |
| JP | 2001100108 A | 4/2001 |
| JP | 2002267946 A | 9/2002 |
| JP | 2003114455 A | 4/2003 |
| JP | 2006030858 A | 2/2006 |

OTHER PUBLICATIONS

Smith, Warren J., "Modern Lens Design," 2004, Second Edition, pp. 160-176.

* cited by examiner

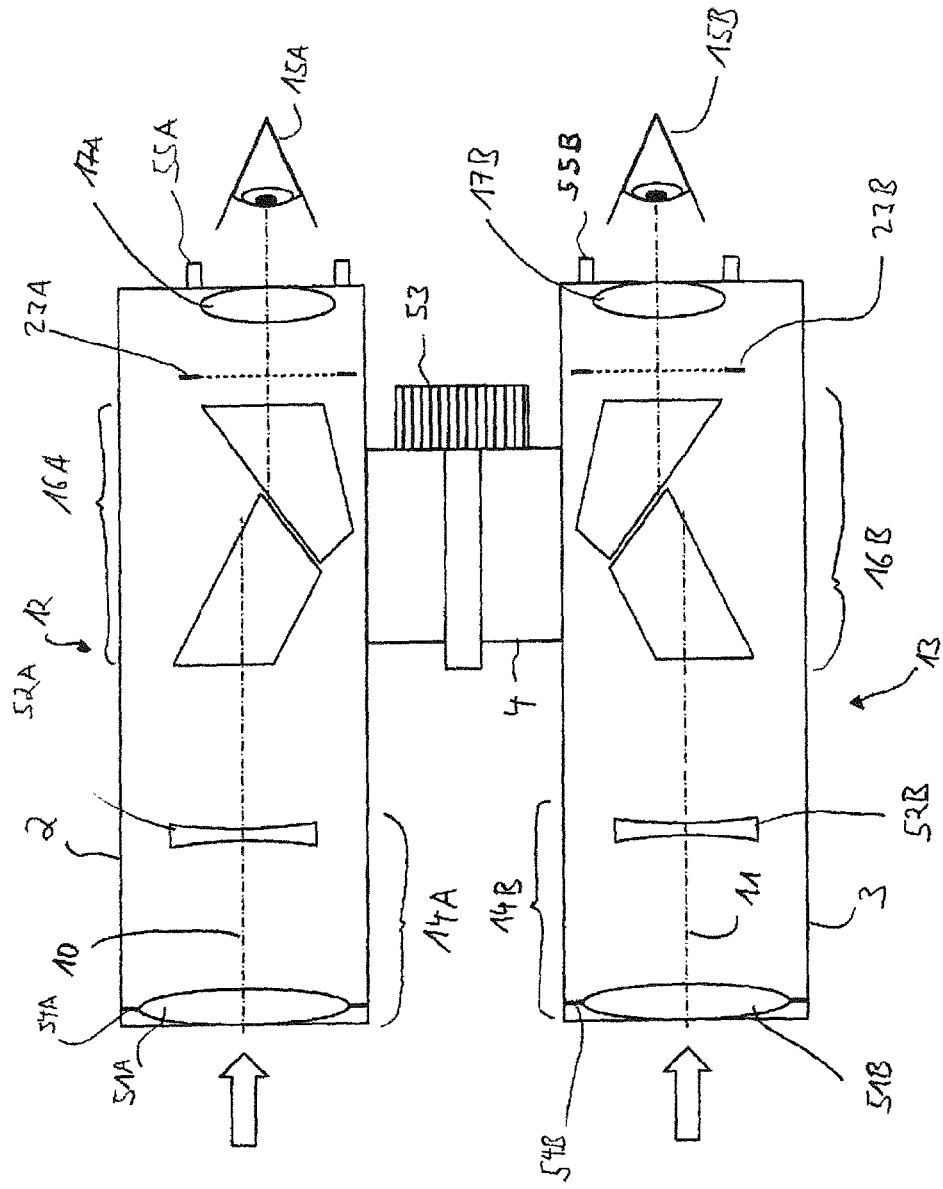

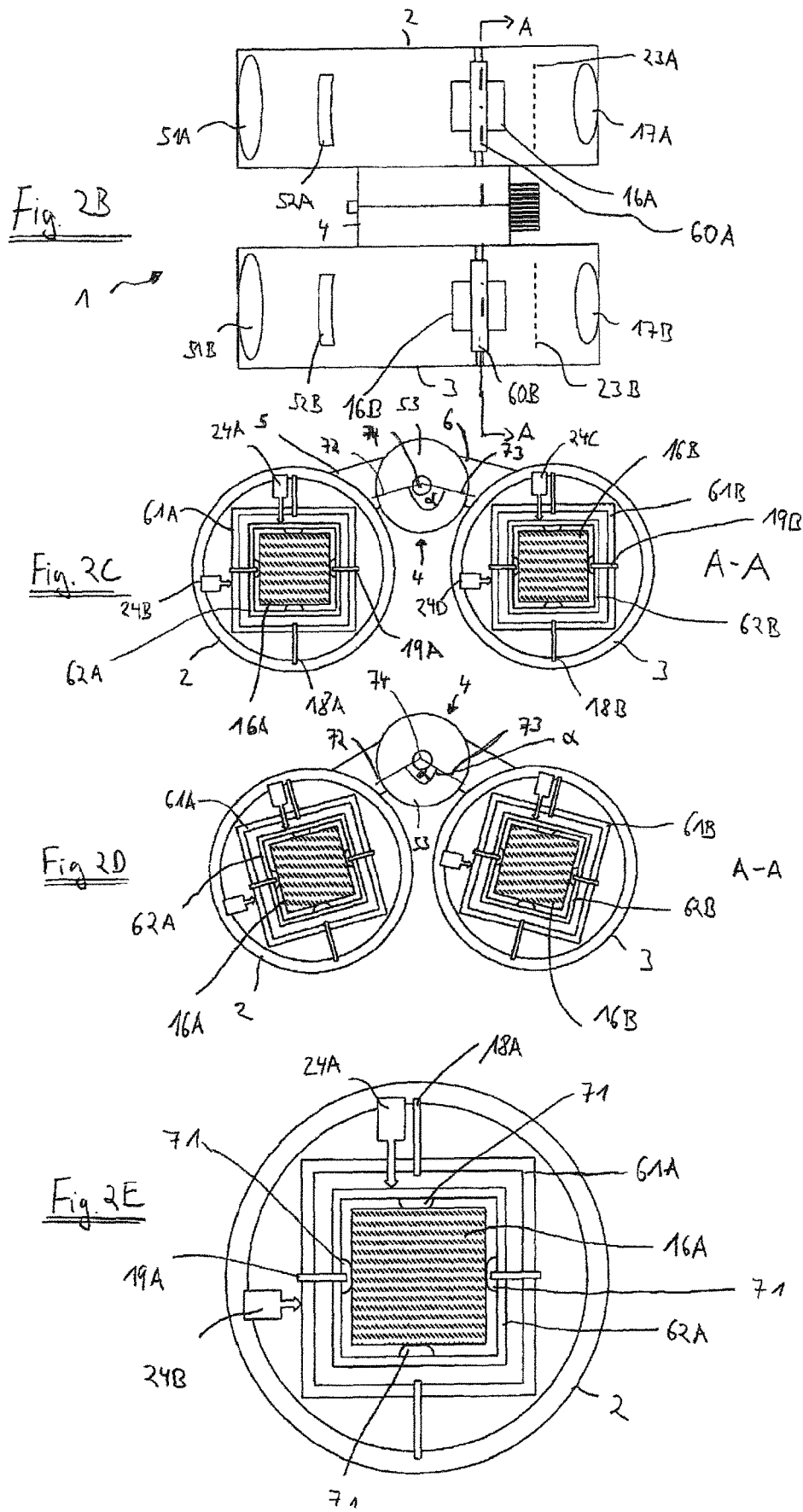

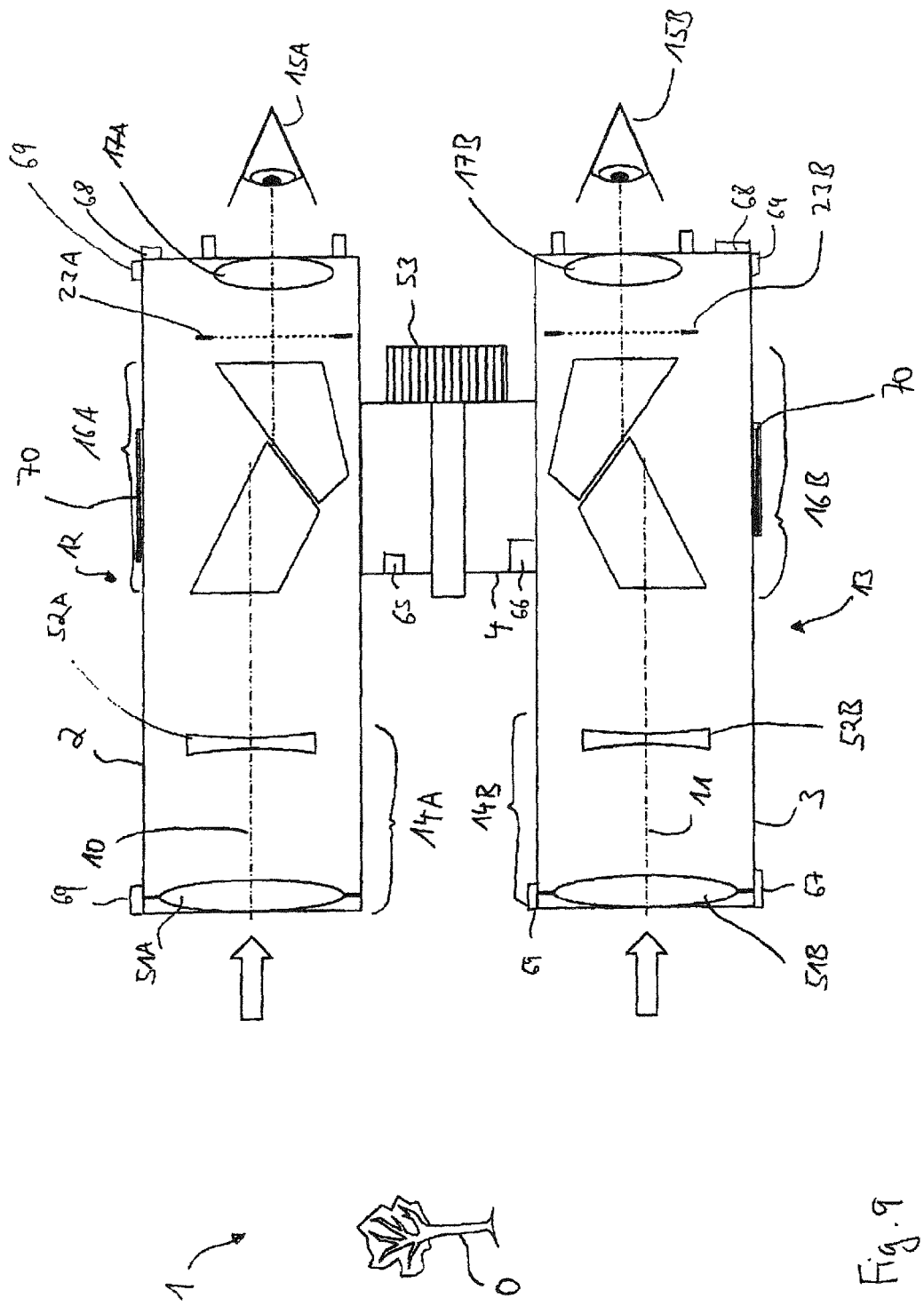

OPTICAL SYSTEM FOR IMAGING AN OBJECT

RELATED APPLICATIONS

This application claims priority to U.S. Provisional App. 61/586,262, filed Jan. 13, 2012, which is incorporated herein by reference.

TECHNICAL FIELD

This application relates to an optical system for imaging an object, wherein the optical system comprises an objective, an image stabilization unit and an image plane. In one exemplary embodiment, by way of example, the optical system is provided with an eyepiece.

BACKGROUND OF THE INVENTION

The invention relates to an optical system for imaging an object, wherein the optical system comprises an objective, an image stabilization unit and an image plane. In one exemplary embodiment, by way of example, the optical system is provided with an eyepiece.

The optical system designated above is used for example in a telescope or a spyglass. The image acquired by an observer through the telescope or the spyglass is often perceived as blurred since trembling movements or rotary movements of the user's hands, but also background movements in turn cause movements of the optical system. In order to avoid this, it is known to stabilize images in an optical system. Known solutions use stabilization devices for stabilizing the image by means of a mechanical device and/or an electronic device.

DE 23 53 101 C3 discloses an optical system in the form of a telescope which comprises an objective, an image stabilization unit in the form of a prism erecting system and an eyepiece. The prism erecting system is mounted in a cardan-type fashion in a housing of the telescope. This is understood to mean that the prism erecting system is arranged in the housing of the telescope in such a way that the prism erecting system is mounted in a manner rotatable about two axes arranged at right angles with respect to one another. A device designated as a cardan-type mount is generally used for the rotatable mounting. An articulation point of the prism erecting system mounted in a cardan-type fashion in the housing is arranged centrally between an image-side principal plane of the objective and an object-side principal plane of the eyepiece. On account of its inertia, the prism erecting system mounted in a cardan-type fashion is not moved as a result of rotary trembling movements that occur. It thus remains fixed in space. An image blur that arises on account of the rotary trembling movement of the housing is compensated for in this way.

DE 39 33 255 C2 discloses a binocular spyglass with image stabilization, this instrument comprising a prism erecting system. The prism erecting system comprises Porro prisms each having a tilting axis. The Porro prisms are embodied in a manner pivotable about their respective tiling axis. Motors are provided for pivoting the Porro prisms. The pivoting is effected in a manner dependent on a trembling movement that causes an observed image to be blurred.

A further optical system comprising an image stabilization unit is known from U.S. Pat. No. 5,910,859. The image stabilization unit of this optical system is embodied in the form of an erecting system arranged at an optically neutral point centrally between an objective and an eyepiece. An optically neutral point is understood to mean a point about which the objective and the eyepiece can be rotated relatively in space, without the position of an image of an object being shifted, wherein the erecting system remains fixed in space. The erecting system is arranged in a manner movable about the optically neutral point and about two axes arranged perpendicular to the optical axis. If the erecting system is kept stable in space even in the case of a trembling movement, then the image of an object is also stabilized when the object is viewed by means of this known optical system. The optically neutral point can also be described as follows. An optically neutral point is understood to mean a point on an optical axis between an objective and an eyepiece about which an image stabilization unit is arranged in a rotatable fashion, such that in the case of a rotary trembling movement about an arbitrary point the direction of the image of an object which is viewed through the objective and the eyepiece remains fixed in space, in the same way as the image stabilization unit.

Considerations have revealed that the position of the erecting system as proposed in U.S. Pat. No. 5,910,859 necessitates a relatively large erecting system in order that the beam is not vignetted. Consequently, a housing in which the erecting system is arranged is likewise quite large. It has the form of a box. The esthetic impression given by this instrument in brick form is referred to by many users as not very attractive. Furthermore, a relatively large erecting system has the consequence that the moment of inertia of the erecting system is quite large. Therefore, relatively large forces are necessary in order to move the erecting system. In order to provide these relatively large forces, high-power motors are generally used, which for their part require a large structural space. Such motors furthermore have a high energy consumption, such that this leads to shortened operating times of batteries which are generally used for supplying energy to the motors.

Furthermore, in a spyglass known from the prior art, it is known to use a single stabilization unit jointly both for a first optical subsystem in a first tube and for a second optical subsystem in a second tube. The dictates of construction mean that this single stabilization unit is at least as wide as the distance between the first tube and the second tube. Furthermore, this single stabilization unit has a high weight. If a motor is then used for adjusting the single stabilization unit, said motor in turn has to be powerful, which in turn leads to the problems already explained.

Accordingly, it would be desirable to provide a system that addresses the problem of specifying an optical system for imaging an object which comprises an image stabilization unit having a relatively low moment of inertia, such that in comparison with the prior art lower forces for adjusting the image stabilization unit and a smaller housing for the optical system can be used.

SUMMARY OF THE INVENTION

According to the system described herein, an optical system for imaging an object comprises at least one first objective, at least one first image stabilization unit and at least one first image plane. As viewed from the first objective in the direction of the first image plane, firstly the first objective, then the first image stabilization unit and then the first image plane are arranged along a first optical axis of the optical system. One exemplary embodiment provides for the first objective to be designed for focusing and to be displaced for example along a first optical axis for the purpose of focusing. A further exemplary embodiment provides for the first objective to comprise at least one first front unit and at least one first focusing unit, wherein the first focusing unit is displaced along the first optical axis for the purpose of focusing. Once again as an alternative, provision is made for the focusing to be effected by a first eyepiece, which is provided for example at the optical system and will be discussed further below.

The system described herein now provides for the first image stabilization unit to have at least one first entrance surface and at least one first exit surface. The first entrance surface is directed toward the first objective. By contrast, the first exit surface is directed toward the first image plane. Furthermore, the first exit surface is arranged at a distance in a range of 1 mm to 20 mm from the first image plane.

The system described herein is based on the surprising insight that the arrangement of the first exit surface of the first image stabilization unit relative to the first image plane in the abovementioned range makes it possible to reduce the moment of inertia of the first image stabilization unit in such a way that motors having a relatively low force in comparison with the prior art, for example, can be used for adjusting the first image stabilization unit. At the same time, it is possible that smaller image stabilization units than in the prior art can be used, without the imaging properties of the optical system according to the system described herein being impaired. Consequently, it is also possible to use a smaller housing than in the prior art, thus giving rise to an esthetic impression that is attractive for many users.

One embodiment of the optical system according to the invention additionally or alternatively provides for the optical system to comprise one of the following features: the first exit surface is arranged at a distance in a range of 2 mm to 15 mm from the first image plane, or the first exit surface is arranged at a distance in a range of 3 mm to 12 mm from the first image plane. Considerations have surprisingly shown that when the first exit surface is arranged in one of the abovementioned ranges, the desired aim can be achieved particularly well.

A further embodiment of the optical system according to the invention additionally or alternatively provides for the first image stabilization unit to be embodied in a movable fashion. By way of example, the first image stabilization unit is embodied in a manner pivotable about at least one predefinable point or about at least one pivotable axis. By way of example, the first image stabilization unit is embodied in a manner pivotable about two axes arranged perpendicular to one another. It is explicitly pointed out that the system described herein is not restricted to the abovementioned movements. Rather, the first image stabilization unit can also be moved by any other suitable type of movement and in any suitable direction.

Yet another embodiment of the optical system according to the invention additionally or alternatively provides for the optical system to comprise one of the following features:
a first image acquisition unit is arranged in the first image plane,
a first image acquisition unit embodied as a semiconductor-based sensor is arranged in the first image plane, or
the optical system comprises at least one first eyepiece, wherein firstly the first image plane and then the first eyepiece are arranged as viewed from the first objective in the direction of the first image plane.

Additionally or alternatively, provision is made for arranging a first graticule in the first image plane, said first graticule being arranged at a first housing or at the first image acquisition unit, wherein said first graticule likewise carries out any motion of the first image acquisition unit.

The abovementioned exemplary embodiments therefore have the following order of the individual units, as viewed from the first objective in the direction of the first image plane: the first objective—the first image stabilization unit—the first image plane—the first eyepiece. A further exemplary embodiment provides for the image plane of the first objective and the image plane of the first eyepiece to coincide.

A further embodiment of the optical system according to the invention additionally or alternatively provides for the optical system to comprise a first housing, wherein the first objective, the first image stabilization unit and the first image plane are arranged in said first housing. Additionally or alternatively, a further exemplary embodiment of the optical system according to the invention provides for the first eyepiece to be arranged in the first housing.

One embodiment of the optical system according to the invention additionally or alternatively provides for the optical system to comprise at least one second objective, at least one second image stabilization unit and at least one second image plane. The abovementioned units, too, are arranged in a specific order. It is thus provided that, as viewed from the second objective in the direction of the second image plane, firstly the second objective, then the second image stabilization unit and then subsequently the second image plane are arranged along a second optical axis of the optical system. One exemplary embodiment provides for the second objective to be designed for focusing and to be displaced for example along a second optical axis for the purpose of focusing. A further exemplary embodiment provides for the second objective to comprise at least one second front unit and at least one second focusing unit, wherein the second focusing unit is displaced along the second optical axis for the purpose of focusing. Once again as an alternative, provision is made for the focusing to be effected by a second eyepiece, which is provided for example at the optical system and will be discussed further below.

The second image stabilization unit, then, has at least one second entrance surface and at least one second exit surface. The second entrance surface is directed toward the second objective. By contrast, the second exit surface is directed toward the second image plane. The second exit surface is arranged at a distance in a range of 1 mm to 20 mm from the second image plane. In particular, provision is made for the second exit surface to be arranged at a distance in a range of 2 mm to 15 mm from the second image plane. Yet another embodiment of the optical system according to the invention provides for the second exit surface to be arranged at a distance in a range of 3 mm to 12 mm from the second image plane. The abovementioned exemplary embodiments are suitable, in particular, for a spyglass comprising optical units for each eye of a user.

A further embodiment of the optical system according to the invention additionally or alternatively provides for the optical system to comprise one of the following features:
a second image acquisition unit is arranged in the second image plane,
a second image acquisition unit embodied as a semiconductor-based sensor is arranged in the second image plane, or
the optical system comprises at least one second eyepiece, wherein firstly the second image plane and then the second eyepiece are arranged as viewed from the second objective in the direction of the second image plane.

Additionally or alternatively, provision is made for arranging a second graticule in the second image plane, said second graticule being arranged at a first housing or at the second image acquisition unit, wherein said second graticule likewise carries out any motion of the second image acquisition unit.

The abovementioned exemplary embodiments therefore have the following order of the individual units, as viewed from the second objective in the direction of the second image plane: the second objective—the second image stabilization unit—the second image plane—the second eyepiece. A further exemplary embodiment provides for the image plane of the second objective and the image plane of the second eyepiece to coincide.

A further embodiment of the optical system according to the invention additionally or alternatively provides for the optical system to comprise a second housing. The second objective, the second image stabilization unit and the second image plane are arranged in said second housing. The second eyepiece is for example likewise arranged in the abovementioned second housing.

The exemplary embodiments of the optical system which comprise two housings basically comprise two optical subsystems. Thus, a first optical subsystem is arranged in the first housing (for example for one of the two eyes of a user). By contrast, a second optical subsystem is arranged in the second housing (for example for the second of the two eyes of a user).

In yet another exemplary embodiment of the optical system according to the invention, the first housing is connected to the second housing via at least one folding bridge. The folding bridge comprises a first hinge part arranged at the first housing. Furthermore, the folding bridge comprises a second hinge part arranged at the second housing. The folding bridge makes it possible to set the optical system in such a way that the first housing and the second housing can be set to the interocular distance of a user. The first housing and the second housing are accordingly arranged relative to one another in such a way that the first housing is arranged at one of the two eyes of the user and that the second housing is arranged at the other of the two eyes of the user. In other words, that can be expressed as follows. The first eyepiece has a first eyepiece axis, whereas the second eyepiece has a second eyepiece axis. The first eye of a user has a first eye axis, and the second eye of a user has a second eye axis. The first housing and the second housing are accordingly arranged relative to one another in such a way that the first eyepiece axis and the first eye axis are aligned and that the second eyepiece axis and the second eye axis are aligned. In the exemplary embodiment explained here, as a result of the use of a folding bridge it is not necessary to set an interpupillary distance by means of rhombic prisms.

Yet another exemplary embodiment of the optical system according to the invention additionally or alternatively provides for the first image stabilization unit to be embodied as a first erecting system. In particular, provision is made for the first image stabilization unit to be embodied as a first prism erecting system or as a first lens erecting system.

Yet another exemplary embodiment of the optical system according to the invention additionally or alternatively provides for the second image stabilization unit to be embodied as a second erecting system. In particular, provision is made for the second image stabilization unit to be embodied as a second prism erecting system or as a second lens erecting system.

Yet another exemplary embodiment of the optical system according to the invention additionally or alternatively provides for the first image stabilization unit to be arranged with cardan-type mounting in the first housing. This is understood to mean that the first image stabilization unit is arranged in a device in such a way that the first image stabilization unit is mounted in a manner rotatable about two axes arranged at right angles with respect to one another. They do not run for example through a first optical neutral point on the first optical axis. One exemplary embodiment provides for the two axes to be arranged perpendicular to the first optical axis and to intersect at a first intersection point. In particular, provision is made for the first image stabilization unit to be arranged in the first housing in a manner rotatable about a first axis and about a second axis, wherein the first axis and the second axis intersect at a first intersection point. Said intersection point differs for example from the first optical neutral point on the first optical axis. In particular, provision is made for the first axis and the second axis to intersect the first optical axis. A further exemplary embodiment provides for the first axis and the second axis to intersect at the center of gravity of the first image stabilization unit. This results in a very small moment of inertia of the first image stabilization unit. The force for adjusting the first image stabilization unit is relatively low, such that only a low energy is required for the adjustment.

Yet another exemplary embodiment of the optical system according to the invention additionally or alternatively provides for the optical system to comprise one of the following features:
- at least one first drive unit for moving the first image stabilization unit,
- at least one first drive unit for moving the first image stabilization unit, wherein the first drive unit comprises at least one first piezo-ceramic,
- at least one first drive unit for moving the first image stabilization unit, wherein the first drive unit comprises at least one first piezo-actuator,
- at least one first drive unit for moving the first image stabilization unit, wherein the first drive unit comprises at least one first piezo-bending actuator,
- at least one first drive unit for moving the first image stabilization unit and at least one control unit for controlling the first drive unit,
- at least one first drive unit for moving the first image stabilization unit, wherein the first drive unit comprises at least one first piezo-ultrasonic actuator, or
- at least one first drive unit for moving the first image stabilization unit, wherein the first drive unit comprises at least one first piezo-traveling-wave actuator.

Yet another exemplary embodiment of the optical system according to the invention additionally or alternatively provides for the second image stabilization unit to be arranged with cardan-type mounting in the second housing. In the case of the system described herein, this is understood to mean that the second image stabilization unit is arranged in a device in such a way that the second image stabilization unit is mounted in a manner rotatable about two axes arranged at right angles with respect to one another. They do not run for example through a second optical neutral point on the second optical axis. One exemplary embodiment provides for the two axes to be arranged perpendicular to the second optical axis and to intersect at a second intersection point. In particular, provision is made for the second image stabilization unit to be arranged in the second housing in a manner rotatable about a third axis and about a fourth axis, wherein the third axis and the fourth axis intersect at the second intersection point. Said intersection point differs for example from the second optical neutral point on the second optical axis. In particular, provision is made for the third axis and the fourth axis to intersect the second optical axis. A further exemplary embodiment provides for the third axis and the fourth axis to intersect at the center of gravity of the second image stabilization unit. This results in a very small moment of inertia of the second image stabilization unit. The force for adjusting the second image stabilization unit is relatively low, such that only a low energy is required for the adjustment.

Yet another exemplary embodiment of the optical system according to the invention additionally or alternatively provides for the optical system to comprise one of the following features:

at least one second drive unit for moving the second image stabilization unit, at least one second drive unit for moving the second image stabilization unit, wherein the second drive unit comprises at least one second piezo-ceramic, at least one second drive unit for moving the second image stabilization unit, wherein the second drive unit comprises at least one second piezo-actuator, at least one second drive unit for moving the second image stabilization unit, wherein the second drive unit comprises at least one second piezo-bending actuator, at least one second drive unit for moving the second image stabilization unit and at least one second control unit for controlling the second drive unit, at least one second drive unit for moving the second image stabilization unit, wherein the second drive unit comprises at least one second piezo-ultrasonic actuator, or at least one second drive unit for moving the second image stabilization unit, wherein the second drive unit comprises at least one second piezo-traveling-wave actuator.

Considerations have revealed that the embodiment of at least one of the abovementioned drive units as a drive unit based on piezo-technology is particularly advantageous. Such drive units have a low current consumption. Furthermore, such drive units, upon a control voltage being switched off, have a sufficiently large holding force such that an image stabilization unit arranged in a movable fashion need not also be additionally locked. It is desirable to fix a movable image stabilization unit when the optical system is not being used, in order to avoid damage to the image stabilization unit and/or in order still to be able to use the optical system (for example a spyglass) as a spyglass even when a stabilization function is switched off. A further advantage of such drive units is that the movement of such drive units is very accurate on account of the direct dependence of a control voltage supplied. Accordingly, movements of the abovementioned movable image stabilization units can be controlled very accurately. Moreover, only the system described herein enables the above-described drive units to be used. These drive units provide a relatively low drive force which does not suffice for the adjustment of image stabilization units according to the prior art. For this reason, it does not make sense to use the drive units described in the prior art for the adjustment of image stabilization units.

In yet another exemplary embodiment of the optical system according to the invention, the optical system comprises at least one control unit for controlling a first drive unit for moving the first image stabilization unit and a second drive unit for moving the second image stabilization unit. This exemplary embodiment thus provides an individual control unit for two drive units, namely for the first drive unit and for the second drive unit.

A further exemplary embodiment of the optical system according to the invention additionally or alternatively provides for the optical system to comprise at least one control unit which is designed in such a way that it can convert control signals intended for the first drive unit from a first coordinate system into control signals for the second drive unit in a second coordinate system for example on the basis of a coordinate transformation and/or further mathematical methods.

One exemplary embodiment of the optical system according to the invention additionally or alternatively provides for the optical system to comprise one of the following features:

at least one motion detector for determining a motion of the optical system, for example a rotational and/or a translational trembling motion, at least one first motion detector for determining a motion of the optical system and at least one second motion detector for determining a motion of the optical system, wherein the abovementioned motions comprise a rotational and/or a translational trembling motion, for example, at least one stabilization detector for determining a motion of the first image stabilization unit and/or of the second image stabilization unit, or at least one first stabilization detector for determining a motion of the first image stabilization unit and at least one second stabilization detector for determining a motion of the second image stabilization unit.

A further exemplary embodiment of the optical system according to the invention additionally or alternatively provides for a first motion detector and a second motion detector to be arranged in a first housing part. A third speed detector is in turn arranged in a second housing part. Yet another embodiment of the optical system according to the invention provides for the first motion detector, the second motion detector, the third motion detector and/or the fourth motion detector to be arranged only in one of the two housings.

A further exemplary embodiment of the optical system according to the invention additionally or alternatively provides for the first housing to be embodied as a tube. Additionally or alternatively, provision is made for the second housing to be embodied as a tube.

In yet another embodiment of the optical system according to the invention, the optical system is embodied as a spyglass or as a telescope.

The system described herein also relates to a further optical system for imaging an object. This optical system can comprise at least one of the abovementioned or below-mentioned features or a combination of at least two of the abovementioned or below-mentioned features. The further optical system according to the invention comprises at least one first objective, at least one first image plane, at least one second objective and at least one second image plane. The first objective and the first image plane are arranged in a first housing, for example a first tube. Furthermore, the second objective and the second image plane are arranged in a second housing, for example a second tube. Furthermore, provision is made for at least one first image stabilization unit to be arranged in the first housing, and for at least one second image stabilization unit to be arranged in the second housing. At least one first drive unit is provided for moving the first image stabilization unit. Furthermore, at least one second drive unit is provided for moving the second image stabilization unit. In particular, one exemplary embodiment provides for the first drive unit to be arranged in the first housing, and for the second drive unit to be arranged in the second housing. By way of example, the first drive unit is embodied as a piezo-actuator and/or, by way of example, the second drive unit is embodied as a piezo-actuator. The arrangement of the individual image stabilization units in a respective housing makes it possible to significantly reduce the weight of the image stabilization units in comparison with the prior art. This makes it possible to use drive units such as piezo-actuators, for example piezo-bending actuators, for adjusting the image stabilization units.

A further exemplary embodiment of each optical system described above and further below additionally or alternatively provides for controlling the energy consumption of the drive units and limiting it in such a way that only the energy actually required in a given situation will be consumed. In particular, provision is made for performing an image stabilization only when a user actually also uses the optical system. If it is recognized that a user is not using the optical system, for example a spyglass, then an image stabilization is not carried out. A further exemplary embodiment of the optical system additionally or alternatively provides for the extent and quality of the image stabilization to be adapted to the available energy. This exemplary embodiment accordingly provides for the quality of the image stabilization to be reduced if only little energy is available. Yet another exemplary embodiment of the optical system additionally or alternatively provides for the quality of the image stabilization to be adapted to the observation situation. By way of example, a very high-quality image stabilization is not absolutely necessary when the optical system is used in the dark or in the case of a very small magnification. By way of example, an image stabilization can be switched off in these two cases.

For switching on or switching off the image stabilization, one exemplary embodiment of the optical system additionally or alternatively provides for the optical system to comprise at least one measuring device for measuring the voltage of a voltage supply unit for supplying the first drive unit and at least one control unit, wherein the control unit is designed with regard to at least one of the following properties: limiting an angle of rotation of the first image stabilization unit; moving the first image stabilization unit upon a first limit frequency being exceeded and/or a second limit frequency being undershot; or limiting a speed of motion of the first image stabilization unit. A further exemplary embodiment of the optical system additionally or alternatively provides for the optical system to comprise at least one measuring device for measuring the voltage of a voltage supply unit for supplying the second drive unit and at least one control unit, wherein the control unit is designed with regard to at least one of the following properties: limiting an angle of rotation of the second image stabilization unit; moving the second image stabilization unit upon a first limit frequency being exceeded and/or a second limit frequency being undershot; or limiting a speed of motion of the second image stabilization unit. The two exemplary embodiments explained here are based on the considerations presented below.

If it is recognized that the voltage supply unit can make available only a low energy, for example the maximum angle of rotation by which the first image stabilization unit and/or the second image stabilization unit are/is rotated is limited. The motions of the two image stabilization units mentioned above become shorter and/or slower as a result. The energy consumption is reduced as a result.

A further embodiment additionally or alternatively provides for low-frequency and/or high-frequency components of a motion of the optical system (for example a trembling motion) no longer to be taken into account in the image stabilization. Low-frequency components of a motion have hardly any effect on detail identifiability. The low-frequency components are relatively large movements, such that the power consumption of the drive units is reduced if the low-frequency components are no longer taken into account in the image stabilization. With regard to the high-frequency components, considerations have revealed the following. The power required for a movement of an image stabilization unit rises quadratically with the frequency and linearly with the amplitude of the movement. The amplitude of a rotary trembling movement decreases linearly with the frequency. Accordingly, the power consumption of the drive units rises linearly with the frequency of the rotary trembling movement. Consequently, the high-frequency components result in a high energy consumption during the image stabilization. If said high-frequency components are accordingly dispensed with, the energy consumption decreases.

Yet another exemplary embodiment of the optical system additionally or alternatively provides for the amplitude of a movement of one of the image stabilization units generally to be reduced if the voltage supply unit can make available only a certain energy. Additionally or alternatively, provision is made for the speed at which at least one of the image stabilization units is moved to be limited to a maximum speed. The power consumption of the drive unit of the respective image stabilization unit decreases as a result.

A further exemplary embodiment of the optical system additionally or alternatively provides for the optical system to comprise at least one of the features that are explained below.

Thus, one exemplary embodiment of the optical system according to the invention additionally or alternatively provides for the optical system to comprise at least one brightness sensor for determining the ambient brightness and at least one system control unit. In darkness, the perception of a user of the optical system is no longer very sensitive. In darkness, movements of the optical system, in particular on account of rotary trembling movements, are no longer perceived in such a way that they are found to be disturbing. In darkness, the system control unit switches to a night mode (image stabilization with low quality), for example, or completely switches off the image stabilization. As an alternative thereto, provision is made for limiting the angle of rotation of the first image stabilization unit and/or of the second image stabilization unit, moving the first image stabilization unit or the second image stabilization unit only upon a first limit frequency being exceeded and/or a second limit frequency being undershot, or limiting the speed of movement of the first image stabilization unit or of the second image stabilization unit.

In a further embodiment of the optical system, the optical system is additionally or alternatively provided with at least one position sensor for determining an inclination of the optical system and with at least one system control unit for switching off an image stabilization at the optical system. This embodiment proceeds from the concept that observations of an object by means of the optical system are generally effected in such a way that the optical system is oriented virtually horizontally. A deviation of the optical axis(axes) of the optical system from the horizontal takes place for example if the optical system is carried by a strap around a user's neck. If the optical axis of the optical system is oriented at an angle of, for example 70° to 100° with respect to the horizontal, it can be assumed that the optical system is not being used. By way of example, the system control unit then switches off the image stabilization.

Yet another exemplary embodiment of the optical system additionally or alternatively provides for the optical system to comprise at least one sensor for identifying a monocular application of the optical system and at least one system control unit for switching off an image stabilization at the optical system. This exemplary embodiment is based on the concept that a binocular optical system can also be used in a monocular fashion. By way of example, this is done by arranging a so-called optical booster at one of the two optical subsystems. An optical booster is understood to mean, in particular, a small, also independently usable, telescope which has a small magnification (for example 2× to 4×) and which can be placed onto an eyepiece. It is identified by means of the sensor (for example a switch). The system control unit then switches off the image stabilization of the other of the two optical subsystems. This saves energy.

Yet another exemplary embodiment of the optical system additionally or alternatively provides for the provision of at least one sensor for identifying an eye of a user and at least one system control unit for switching off an image stabilization at the optical system. If no eye is situated at the optical system, then it is also not absolutely necessary to carry out an image stabilization. By way of example, a photosensor for measuring the light at the eyepiece is suitable as a sensor. Still further exemplary embodiments provide a capacitance measurement.

A further exemplary embodiment of the optical system additionally or alternatively provides for the optical system to comprise at least one sensor for identifying an arrangement of an objective protective cap and/or eyepiece protective cap and at least one system control unit for switching off an image stabilization at the optical system. If a protective cap is arranged on the objective and/or the eyepiece, it can be assumed that the optical system is not being used. The system control unit then switches off the image stabilization.

Yet another exemplary embodiment of the optical system additionally or alternatively provides for the optical system to comprise at least one sensor for identifying an arrangement of a hand of a user and at least one system control unit for switching off an image stabilization at the optical system. If it is identified that no hand is touching the optical system, then it can be assumed that the optical system is not being used. The system control unit then switches off the image stabilization. By way of example, a capacitive sensor (capacitance measurement), a photosensor or a pressure sensor is used in this exemplary embodiment.

Yet another exemplary embodiment of the optical system additionally or alternatively provides for the optical system to comprise at least one sensor for identifying a minimum folding angle of the folding bridge and at least one system control unit for switching off an image stabilization at the optical system. This embodiment is based on the concept that, in a binocular optical system (for example binoculars), the minimum folding angle is set when the binoculars are being transported. In this case, the system control unit then switches off the image stabilization.

In at least one of the abovementioned exemplary embodiments, the image stabilization by the first image stabilization unit and/or the second image stabilization unit is switched on as standard. Still further exemplary embodiments provide for the optical system to comprise a switching unit (for example a pushbutton) in order to switch the image stabilization on or off. By way of example, the switching unit has to be actuated for as long as an image stabilization is desired.

BRIEF DESCRIPTION OF THE DRAWINGS

Embodiments of the system described herein will now be explained in greater detail on the basis of the figures, in which:

FIG. 1B shows a second schematic illustration of the binoculars according to FIG. 1A;

FIG. 2B shows a third schematic illustration of the binoculars according to FIG. 1A;

FIG. 2C shows a first sectional illustration of the binoculars along the line A-A in accordance with FIG. 2B;

FIG. 2D shows a second sectional illustration of the binoculars along the line A-A in accordance with FIG. 2B;

FIG. 2E shows an enlarged sectional illustration of an image stabilization unit of the binoculars in accordance with FIGS. 2C and 2D;

FIG. 9 shows a fourth schematic illustration of the binoculars according to FIG. 1A.

DETAILED DESCRIPTION OF VARIOUS EMBODIMENTS

The system described herein is discussed below on the basis of an optical system in the form of a binocular spyglass 1 (simply called binoculars hereinafter). However, it is explicitly pointed out that the system described herein is not restricted to a binocular spyglass. Rather, the system described herein is suitable for any optical system, for example including for a telescope.

Figure 1A:
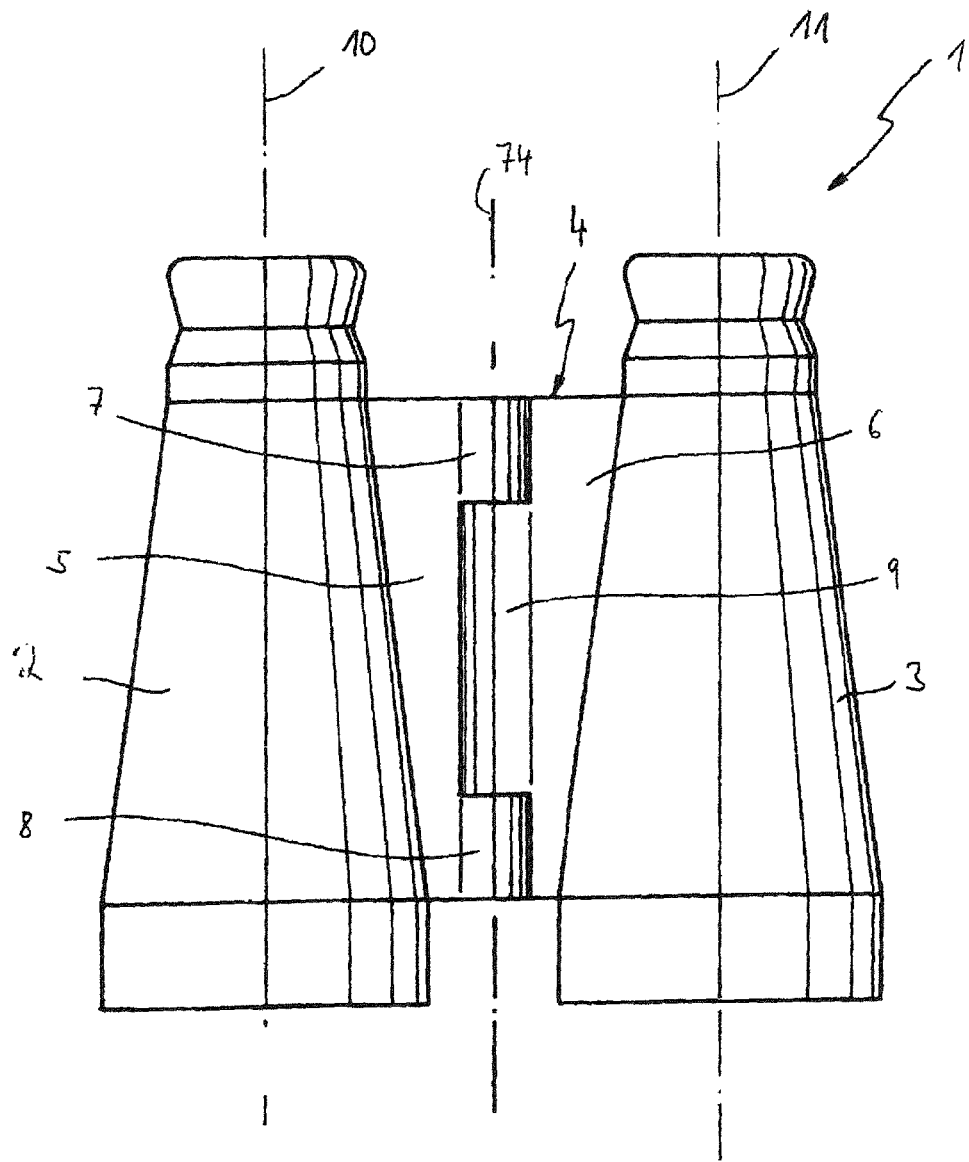
FIG. 1A shows a first schematic illustration of an optical system in the form of binoculars having a folding bridge.

FIG. 1A shows a first schematic illustration of the binoculars 1, comprising a tube-type first housing part 2 and a tube-type second housing part 3. A first optical axis 10 runs through the first housing part 2. By contrast, a second optical axis 11 runs through the second housing part 3. The first housing part 2 together with the second housing part 3 are connected to one another by means of a folding bridge 4. The folding bridge 4 has a first hinge part 5 integrally formed on the first housing part 2. Furthermore, the folding bridge 4 has a second hinge part 6 arranged on the second housing part 3. The first hinge part 5 has a first receiving part 7 and a second receiving part 8, between which a third receiving part 9 of the second hinge part 6 is arranged. An axial pin (not illustrated) runs through the first receiving part 7, the second receiving part 8 and also the third receiving part 9, such that it is possible to set the relative position of the first housing part 2 and of the second housing part 3 about an articulation axis 74 with respect to one another. In this way, it is possible to set the first housing part 2 and the second housing part 3 to the interpupillary distance of a user, such that firstly the first housing part 2 is arranged at one of the two eyes of the user, and such that secondly the second housing part 3 is arranged at the other of the two eyes of the user.

FIG. 1B shows a further illustration of the binoculars 1. The first housing part 2 has a first optical subsystem 12. The first optical subsystem 12 is provided with a first objective 14A, with a first image stabilization unit 16A embodied as a first prism system, and a first eyepiece 17A. A first eye 15A of a user can be arranged at the first eyepiece 17A in order to observe an object O. The first optical axis 10 of the first optical subsystem 12 is offset laterally somewhat on account of the first prism system 16A (first image stabilization unit 16A), thus resulting in a stepped embodiment of the first optical axis 10.

In this exemplary embodiment, the first objective 14A consists of a first front unit 51A and a first focusing unit 52A. Further embodiments of the first objective 14A provide a different number of individual lenses or cemented elements consisting of lenses. For the purpose of focusing the object O viewed through the binoculars 1, either the first eyepiece 17A or the first focusing unit 52A can be displaced axially along the first optical axis 10. In a further embodiment, the first front unit 51A or even the complete first objective 14A is displaced along the first optical axis 10. In a further embodiment, the first front unit 51A and the first focusing unit 52A are displaced relative to one another.

The second housing part 3 has a second optical subsystem 13. The second optical subsystem 13 is provided with a second objective 14B, with a second image stabilization unit 16B embodied as a prism system, and with a second eyepiece 17B. A second eye 15B of the user can be arranged at the second eyepiece 17B in order to observe the object O. The second optical axis 11 of the second optical subsystem 13 is offset laterally somewhat on account of the second image stabilization unit 16B (prism system), thus resulting in a stepped embodiment of the second optical axis 11.

In this exemplary embodiment, the second objective 14B consists of a second front unit 51B and a second focusing unit 52B. Further embodiments of the second objective 14B provide a different number of individual lenses or cemented elements consisting of lenses. For the purpose of focusing the object O viewed through the binoculars 1, either the second eyepiece 17B or the second focusing unit 52B can be displaced axially along the second optical axis 11. In a further embodiment, the second front unit 51B or even the complete second objective 14B is displaced along the second optical axis 11. In a further embodiment, the second front unit 51B and the second focusing unit 52B are displaced relative to one another.

In both of the optical subsystems 12, 13 presented above, the beam direction of the light beams incident in the optical subsystems 12, 13 is as follows: object O—objective 14A, 14B—image stabilization unit (prism system) 16A, 16B—eyepiece 17A, 17B—eye 15A, 15B.

For the purpose of focusing, in the exemplary embodiment illustrated here, a rotary knob 53 is arranged on the folding bridge 4, by means of which rotary knob the first focusing unit 52A and the second focusing unit 52B can be displaced jointly along the two optical axes 10 and 11. A further embodiment provides for the first objective 14A and the second objective 14B (or at least units of the first objective 14A and of the second objective 14B) to be adjusted relative to one another.

In the exemplary embodiment illustrated here, both the first objective 14A and the second objective 14B generate a real image, upside down relative to the object O viewed, in an image plane assigned to the respective objective 14A, 14B. The first prism system 16A (first image stabilization unit) assigned to the first objective 14A and the second prism system 16B (second image stabilization unit) assigned to the second objective 14B are used for image erecting. Consequently, the upside down image is erected again and imaged in a new image plane, the left intermediate image plane 23A or the right intermediate image plane 23B. The first prism system 16A (first image stabilization unit) and the second prism system 16B (second image stabilization unit) can be constructed as an Abbe-König prism system, a Schmidt-Pechan prism system, an Uppendahl prism system, a Porro prism system or some other prism system variant. By way of example, a first field stop that sharply delimits the field of view is arranged in the left intermediate image plane 23A. Furthermore, a second field stop that sharply delimits the field of view can be arranged for example in the right intermediate image plane 23B.

The first eyepiece 17A is used for imaging the image of the left intermediate image plane 23A into an arbitrary distance, e.g. into infinity or into a different distance. Furthermore, the second eyepiece 17B is used for imaging the image of the right intermediate image plane 23B into an arbitrary distance, e.g. into infinity or into a different distance.

The first aperture stop 54A of the first optical subsystem 12 and the second aperture stop 54B of the second optical subsystem 13 can be formed either by a mount of an optical element of the corresponding optical subsystem 12, 13, generally by the mount of the lenses of the first front unit 51A or of the second front unit 51B, or by a separate stop. It can be imaged in the beam direction through the corresponding optical subsystem 12 or 13 into a plane which lies in the beam direction behind the corresponding eyepiece 17A or 17B and is typically at a distance of 5 to 25 mm therefrom. This plane is called the plane of the exit pupil.

In order to protect the user against laterally incident light, a pull-out, turn-out or foldable first eyecup 55A can be provided at the first eyepiece 17A and a pull-out, turn-out or foldable second eyecup 55B can be provided at the second eyepiece 17B.

Figure 2A:
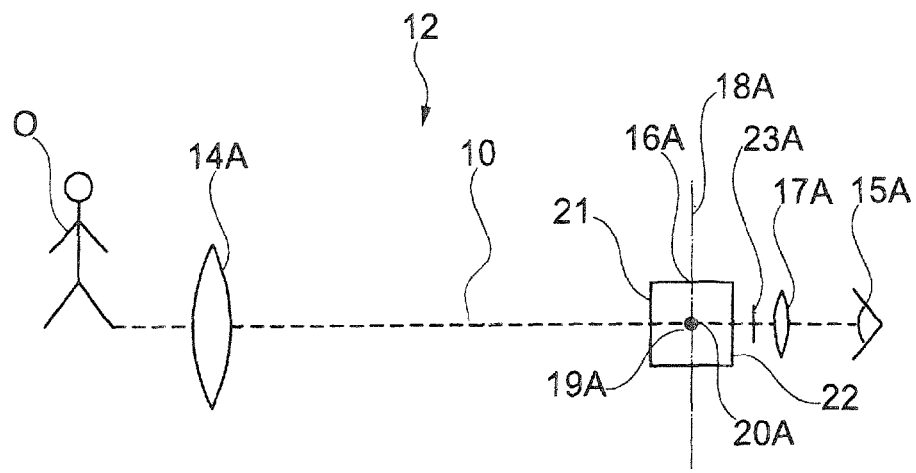
FIG. 2A shows a schematic illustration of a first optical subsystem.

FIG. 2A shows a schematic illustration of the first optical subsystem 12 arranged in the first housing part 2. The second optical subsystem 13 arranged in the second housing part 3 has an identical construction to the first optical subsystem 12. Consequently, the explanations below with regard to the first optical subsystem 12 are also applicable to the second optical subsystem 13.

As can be seen from FIG. 2A, the first objective 14A, the first image stabilization unit 16A and the first eyepiece 17A are arranged along the first optical axis 10 from the object O in the direction of the first eye 15A of the user. In the exemplary embodiment illustrated here, the first image stabilization unit 16A is embodied as a prism erecting system. As an alternative thereto, a further exemplary embodiment provides for the first image stabilization unit 16A to be embodied as a lens erecting system. As mentioned above, the second optical subsystem 13 has an identical construction to the first optical subsystem 12. Thus, the second prism system here is embodied as the second image stabilization unit 16B.

FIG. 2B shows a further schematic illustration of the binoculars 1. FIG. 2B is based on FIG. 1B. Identical structural parts are provided with identical reference signs. FIG. 2B now also shows the movement devices for the first image stabilization unit 16A and the second image stabilization unit 16B. The first image stabilization unit 16A is arranged in a first cardan-type mount 60A. The second image stabilization unit 16B is arranged in a second cardan-type mount 60B.

The arrangement of the two image stabilization units 16A and 16B is illustrated in greater detail in FIG. 2C. The first cardan-type mount 60A has a first outer suspension 61A, which is arranged on the first housing part 2 via a first axis 18A. The first outer suspension 61A is arranged in a manner rotatable about the first axis 18A. Furthermore, the first cardan-type mount 60A has a first inner suspension 62A, which is arranged in a rotatable manner on the first outer suspension 61A via a second axis 19A. The first inner suspension 62A is rotated about the second axis 19A by means of a first drive unit 24A. Furthermore, a second drive unit 24B is provided, by means of which the first outer suspension 61A is rotated about the first axis 18A. FIG. 2E shows the abovementioned details in an enlarged illustration. The first image stabilization unit 16A is held on the first inner suspension 62A by means of clamping holders 71.

The second image stabilization unit 16B is arranged on the second cardan-type mount 60B. The second cardan-type mount 60B has a second outer suspension 61B, which is arranged on the second housing part 3 via a third axis 18B. The second outer suspension 61B is arranged in a manner rotatable about the third axis 18B. Furthermore, the second cardan-type mount 60B has a second inner suspension 62B, which is arranged in a rotatable manner on the second outer suspension 61B via a fourth axis 19B. The second inner suspension 62B is rotated about the third axis 19B by means of a third drive unit 24C. Furthermore, a fourth drive unit 24D is provided, by means of which the second outer suspension 61B is rotated about the third axis 18B.

As mentioned above, FIG. 2A shows the first optical subsystem 12. The first image stabilization unit 16A is arranged by means of the first cardan-type mount 60A in such a way that it is mounted in a manner rotatable about two axes arranged at right angles to one another, namely about the first axis 18A and about the second axis 19A, which projects into the plane of the drawing. The first axis 18A and the second axis 19A intersect at a first intersection point 20A. The first intersection point 20A is arranged such that it differs from a first optically neutral point on the first optical axis 10. In this respect, reference is made to the explanations already given further above.

The first image stabilization unit 16A has a first entrance surface 21 and a first exit surface 22. The first exit surface 22 is arranged at a distance in a range of 1 mm to 20 mm from the left intermediate image plane 23A. By way of example, the first exit surface 22 is arranged at a distance in a range of 2 mm to 15 mm from the left intermediate image plane 23A. As an alternative thereto, provision is made for the first exit surface 22 to be arranged at a distance in a range of 3 mm to 12 mm from the left intermediate image plane 23A.

As already mentioned above, the statements made above and below with regard to the first optical subsystem 12 are correspondingly applicable to the second optical subsystem 13.

The abovementioned arrangement of the first exit surface 22 of the first image stabilization unit 16A with respect to the left intermediate image plane 23A firstly achieves the effect of improving the quality of the image generated by the first optical subsystem 12, since manufacturing tolerances which have to be accepted during the production of the first image stabilization unit 16A no longer have a great effect in the generated image. What is achieved secondly is that, on account of the beam path, the extent and the volume of the first image stabilization unit 16A can turn out to be smaller in comparison with the prior art. This means that the mass of the first image stabilization unit 16A can be smaller than in the prior art. In this way, the moment of inertia of the first image stabilization unit 16A is reduced such that the adjustment of the first image stabilization unit 16A can be effected with a relatively small force. The smaller volume, the smaller extent and also the possibility of using drive units which provide a small force for adjusting the first image stabilization unit 16A make it possible that the first housing part 2 can be made smaller than the housing parts used in the prior art. An elegant housing which to the user is reminiscent of normal binoculars is thus provided which gives an esthetically more attractive impression than the known prior art. An esthetic impression that is attractive to many users is thus achieved. The embodiment of the binoculars in two tubes (namely a first tube corresponding to the first housing part 2 and a second tube corresponding to the second housing part 3) is also made possible, which corresponds to the division of binoculars that is customary to a user, and which significantly simplifies the setting of the interocular distance. Furthermore, the use of two image stabilization units (namely the first image stabilization unit 16A in the first housing part 2 and the second image stabilization unit 16B in the second housing part 3) makes it possible to reduce the moment of inertia of the two image stabilization units significantly in comparison with the prior art, such that piezo-actuators can be used.

Figure 3:
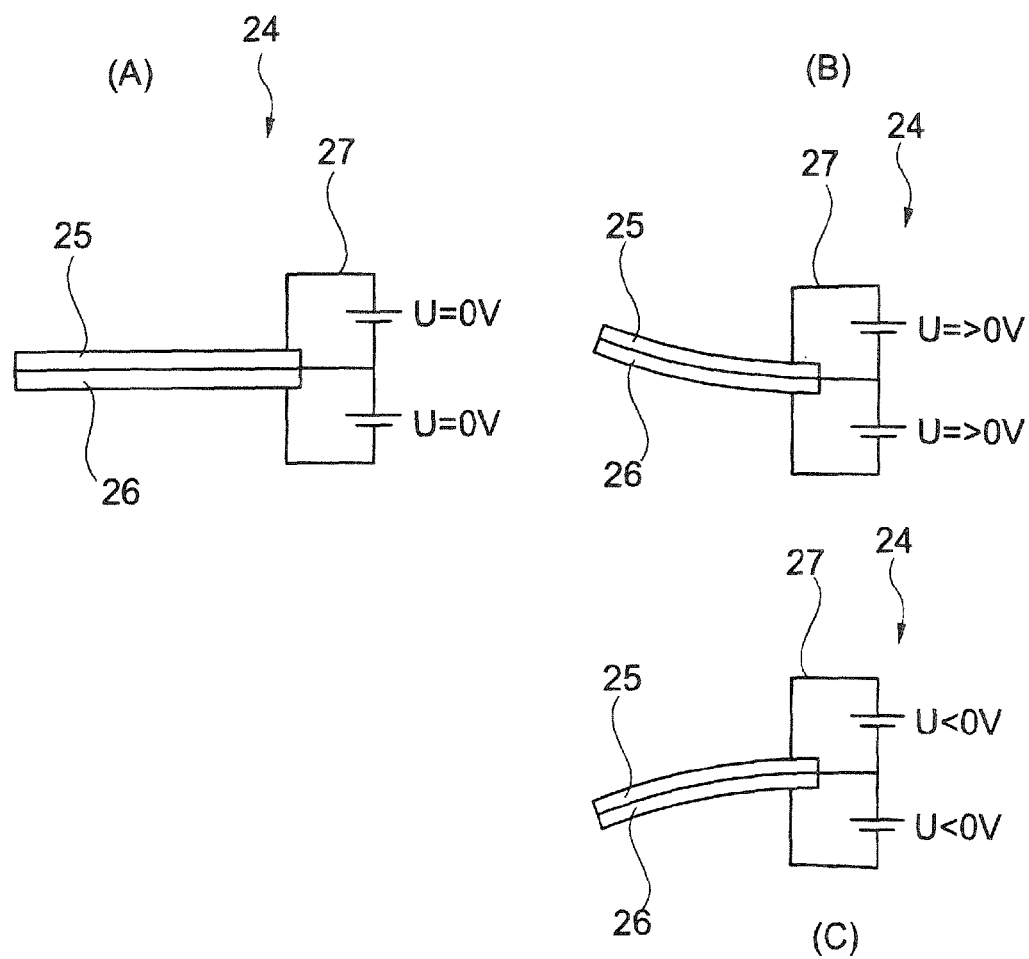
FIGS. 3A to 3C show schematic illustrations of a piezo-bending actuator.

FIGS. 3A-3C show schematic illustrations of a drive unit 24 in the form of a piezo-bending actuator, wherein an actuator is understood to mean an actuating element which can produce a force or a movement. Such an actuating element is often also designated as actuator in the literature. The first drive unit 24A, the second drive unit 24B, the third drive unit 24C and the fourth drive unit 24D are constructed identically to the drive unit 24, for example.

FIG. 3A shows a schematic illustration of the drive unit 24. The drive unit 24 comprises a first piezo-ceramic 25 and a second piezo-ceramic 26, which are arranged one on top of the other. By means of a voltage unit 27, both the first piezo-ceramic 25 and the second piezo-ceramic 26 can be supplied with a voltage. To put it another way, a first voltage is applied to the first piezo-ceramic 25, and a second voltage is applied to the second piezo-ceramic 26. The two aforementioned voltages at the first piezo-ceramic 25 and at the second piezo-ceramic 26 are connected with opposite polarity, such that, by way of example, the first piezo-ceramic 25 expands, on the one hand, and the second piezo-ceramic 26 contracts, on the other hand. As a result, the overall arrangement of the first piezo-ceramic 25 and of the second piezo-ceramic 26 flexes, as illustrated in FIGS. 3B and 3C. These movements are then used to move the first image stabilization unit 16A or the second image stabilization unit 16B, as explained in greater detail below.

FIGS. 4A-4F show schematic illustrations of arrangements of the drive unit 24 in accordance with FIGS. 3A-3C at the first image stabilization unit 16A or the second image stabilization unit 16B.

The exemplary embodiment in accordance with FIG. 4A will now be discussed below. As mentioned above, the drive unit 24 (that is to say the piezo-bending actuator) has an arrangement formed from the first piezo-ceramic and the second piezo-ceramic. This arrangement has a first end and a second end. The first end of the arrangement is fixedly arranged on the first housing part 2 or on the second housing part 3 by means of a mount 28. The second end of the arrangement is connected to the first cardan-type mount 60A of the first image stabilization unit 16A or to the second cardan-type mount 60B of the second image stabilization unit 16B by means of a loose bearing 29. To put it more precisely, the second end of the arrangement is arranged in a movable fashion on a point of the first outer suspension 61A or the second outer suspension 61B. Said point should indeed be understood not just in the mathematical sense, but rather can indeed also be an area or a volume. Together with the axis of rotation provided (that is to say, for example, the first axis or the second axis) the point forms a lever arm 30. Furthermore, the arrangement has a longitudinal axis 31 arranged parallel to the first optical axis 10 or to the second optical axis 11. The system described herein is not restricted to the exemplary embodiment of an arrangement of the drive unit 24 as described here. Rather, any suitable arrangement of the drive unit 24 on the first cardan-type mount 60A of the first image stabilization unit 16A or on the second cardan-type mount 60B of the second image stabilization unit 16B can be used, in particular in the form of the exemplary embodiments described in even greater detail further below. One of said exemplary embodiments includes the fact, in particular, that provision can alternatively be made for the drive unit 24 to be arranged with one of the ends of the arrangement fixedly on the first cardan-type mount 60A of the first image stabilization unit 16A or on the second cardan-type mount 60B of the second image stabilization unit 16B and with the other of the ends of the arrangement loosely on the first housing part 2 or on the second housing part 3.

The loose bearing 29 is designed in such a way that it is possible for the drive unit 24 to move in a first direction (arrow direction A) or in a second direction (arrow direction B). In this case, that end of the arrangement of the drive unit 24 which is arranged on the loose bearing 29 should be configured in such a way as to ensure that the drive unit 24 is mounted on the first cardan-type mount 60A of the first image stabilization unit 16A or on the second cardan-type mount 60B of the second image stabilization unit 16B with as little play as possible. Particularly accurate driving of the movement of the first image stabilization unit 16A or of the second image stabilization unit 16B is possible in this way.

Figure 4:
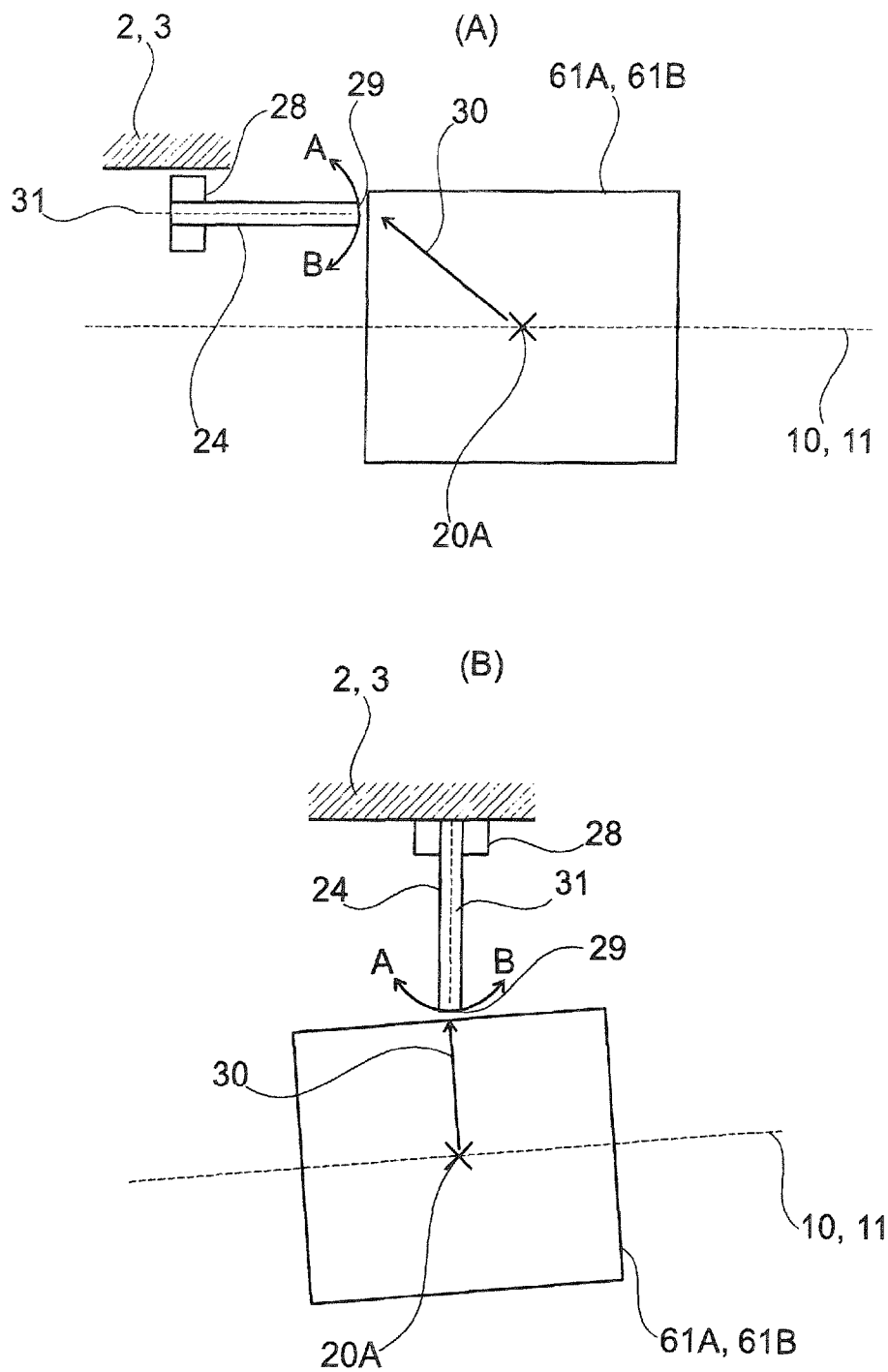
FIGS. 4A to 4F show a schematic illustration of arrangements of a piezo-bending actuator on an image stabilization unit.
Figure 4:
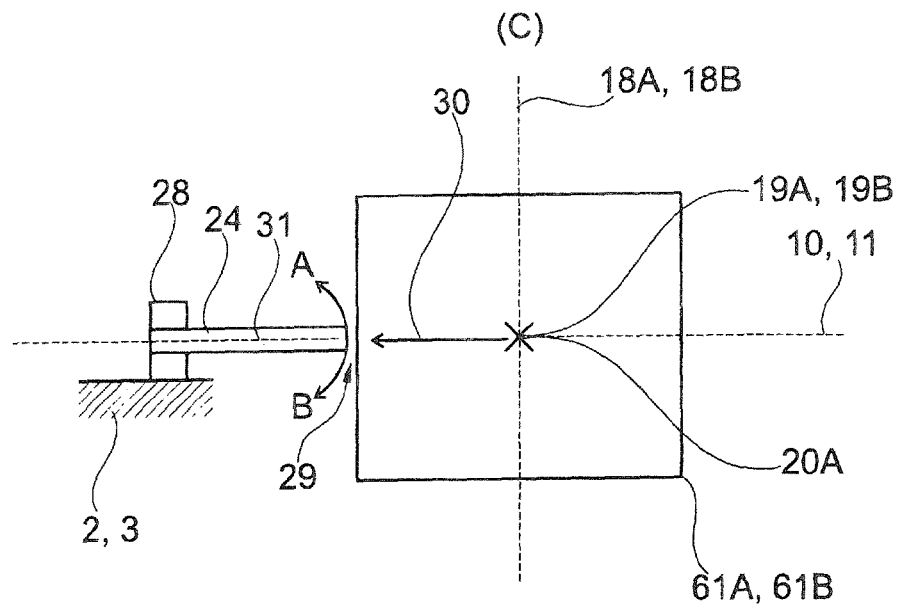
Figure 4:
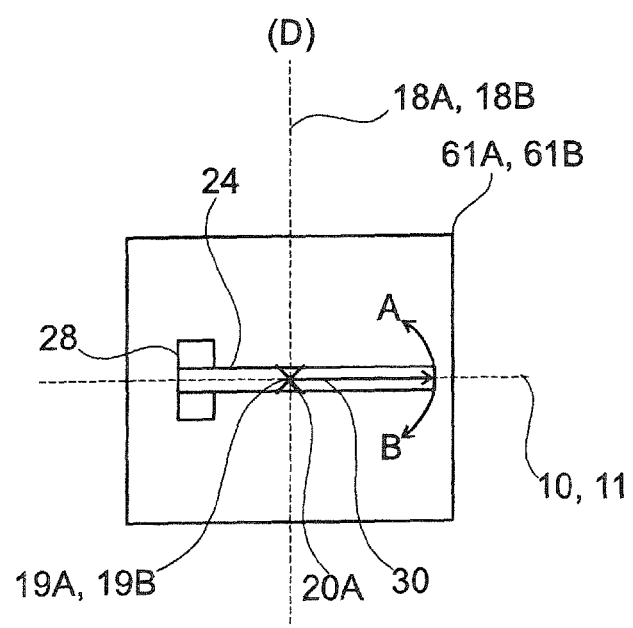
Figure 4:
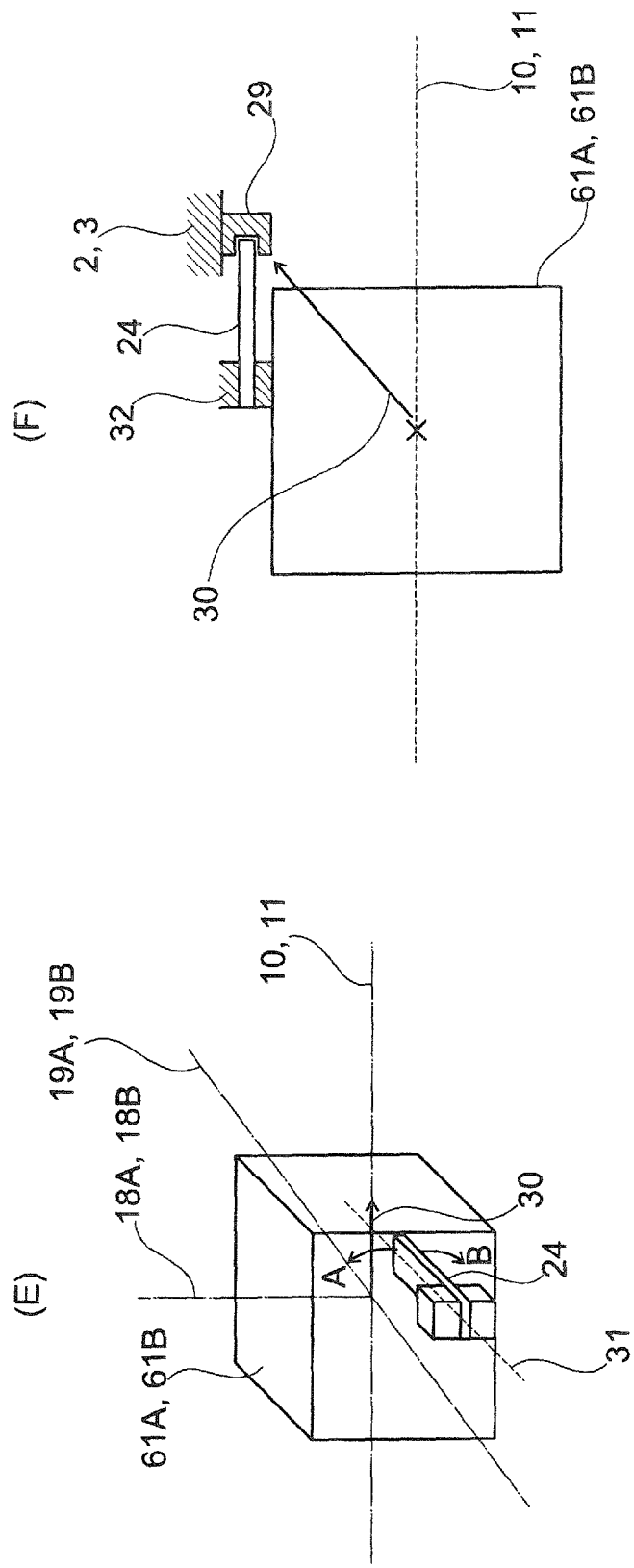

The exemplary embodiment in accordance with FIG. 4B is based on the exemplary embodiment in accordance with FIG. 4A. Identical structural parts are therefore provided with identical reference signs. The exemplary embodiment in accordance with FIG. 4B differs from the exemplary embodiment in FIG. 4A merely in that the longitudinal axis of the drive unit 24 is arranged perpendicular to the first optical axis 10 or the second optical axis 11.

The exemplary embodiment in accordance with FIG. 4C is based on the exemplary embodiment in FIG. 4A. Identical structural units are therefore provided with identical reference signs. In contrast to the exemplary embodiment in FIG. 4A, the exemplary embodiment in FIG. 4C has the difference that the longitudinal axis 31 of the drive unit 24 runs along the first optical axis 10 or the second optical axis 11.

The further exemplary embodiment in accordance with FIG. 4D is based on the exemplary embodiment in FIG. 4C. Identical structural parts are therefore provided with identical reference signs. The exemplary embodiment in FIG. 4D differs from the exemplary embodiment in FIG. 4C merely in that the drive unit 24 is arranged laterally between the first housing part 2 and the first outer suspension 61A on the first image stabilization unit 16A or between the second housing part 3 and the second outer suspension 61B on the second image stabilization unit 16B in such a way that the first image stabilization unit 16A or the second image stabilization unit 16B covers the drive unit 24.

A further exemplary embodiment of possible fixing of the drive unit 24 on the first image stabilization unit 16A or on the second image stabilization unit 16B is illustrated in FIG. 4E. The exemplary embodiment in accordance with FIG. 4E is based on the exemplary embodiment in accordance with FIG. 4A. Identical structural parts are therefore provided with identical reference signs. In contrast to the exemplary embodiment in FIG. 4A, the exemplary embodiment in accordance with FIG. 4E has a drive unit 24, the longitudinal axis 31 of which is firstly arranged parallel to the second axis 19A or to the fourth axis 19B, which is simultaneously the axis of rotation. Furthermore, the longitudinal axis 31 is arranged perpendicular to the first optical axis 10 or to the second optical axis 11.

A further exemplary embodiment is shown in FIG. 4F. The exemplary embodiment in FIG. 4F is likewise based on the exemplary embodiment in FIG. 4A. Identical structural parts are therefore provided with identical reference signs. In contrast to the exemplary embodiment in accordance with FIG. 4A, the exemplary embodiment in FIG. 4F has a fixed bearing 32, on which the drive unit 24 is arranged on the first outer suspension 61A of the first image stabilization unit 16A or on the second outer suspension 61B of the second image stabilization unit 16B. A further end of the drive unit 24 is arranged in a loose bearing 29 arranged on the first housing part 2 or on the second housing part 3.

Figure 5:
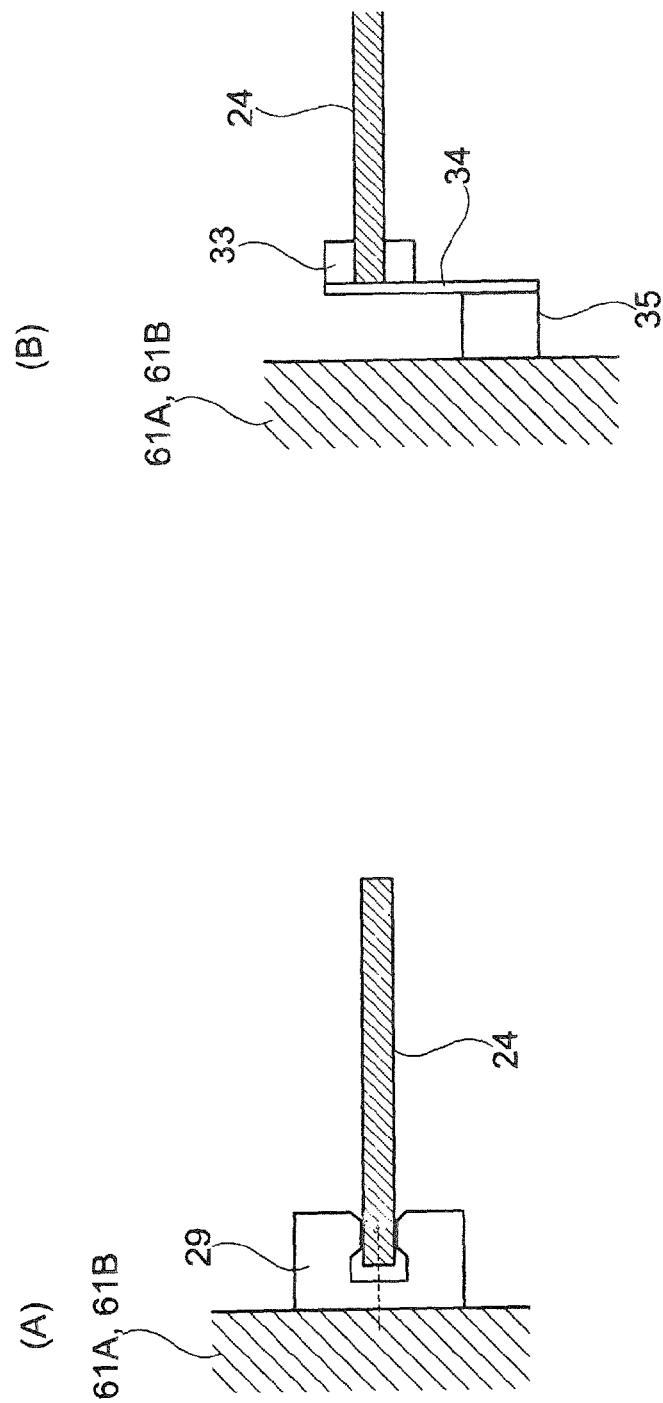
FIGS. 5A and 5B show schematic illustrations of an arrangement of a drive unit on an image stabilization unit.

FIGS. 5A and 5B show schematic illustrations of arrangements of the drive unit 24 on the first image stabilization unit 16A or on the second image stabilization unit 16B. Thus, FIG. 5A shows that the first end of the drive unit 24 is arranged in the loose bearing 29, which is embodied in a C-shaped fashion and has the arrangement formed from the two piezo-ceramics mentioned above. The loose bearing 29 is arranged on the first outer suspension 61A of the image stabilization unit 16A or on the second outer suspension 61B of the second image stabilization unit 16B.

FIG. 5B shows the first outer suspension 61A of the first image stabilization unit 16A or the second outer suspension 61B of the second image stabilization unit 16B, on which a connector 35 is arranged. Arranged on the connector 35 in turn is a spring metal sheet 34, on which a clamping unit 33 is fixed. The first end of the drive unit 24 is fixedly arranged on the clamping unit 33.

What is advantageous in all exemplary embodiments of the drive unit 24 described here is that when a voltage is not fed to the two piezo-ceramics, the drive unit 24 assumes a specific position in space and no longer moves. By way of example, said specific position is the position in which a correct binocular alignment is ensured. It is understood to mean an orientation in such a way that the first optical axis 10 and the second optical axis 11 are oriented parallel to one another. The drive unit 24 can therefore be used as a holding device that fixedly holds the first cardan-type mount 60A of the first image stabilization unit 16A or the second cardan-type mount 60B of the second image stabilization unit 16B. The first image stabilization unit 16A or the second image stabilization unit 16B can therefore no longer move in space. The first image stabilization unit 16A and/or the second image stabilization unit 16B are/is locked and therefore cannot be damaged when the binoculars 1 are not in use.

It is explicitly pointed out that the system described herein is not restricted to the described drive unit 24 in the form of a piezo-bending actuator. Rather, it is possible to use any types of drive units which are suitable for carrying out a movement of the first image stabilization unit 16A or of the second image stabilization unit 16B. These also include drive units which do not operate on the basis of piezo-technology. Further suitable drive units on the basis of piezo-technology are, for example, a piezo-linear actuator, a piezo-traveling-wave actuator or an ultrasonic motor. Piezo-actuators are particularly well suited since they have a high degree of self-locking, such that additional locking of the first image stabilization unit 16A or of the second image stabilization unit 16B can be dispensed with. This has already been explained further above. Furthermore, their current consumption is very low, and so the lifetime of batteries used for voltage supply is greater.

Provision is made for monitoring the movement of the first image stabilization unit 16A or of the second image stabilization unit 16B and thus also the position of the first image stabilization unit 16A or of the second image stabilization unit 16B by means of at least one sensor. By way of example, provision is made of a first sensor for a movement relative to the first axis 18A and a second sensor for a movement relative to the second axis 19A. Additionally or alternatively, provision is made of a third sensor for a movement relative to the third axis 18B and a fourth sensor for a movement relative to the fourth axis 19B. By way of example, a Hall sensor is used as sensor. However, the system described herein is not restricted to this type of sensors. Rather, any suitable type of sensor and also any suitable number of sensors can be used. The abovementioned sensor serves for improving the quality of the image stabilization. It is explicitly pointed out that the system described herein is not restricted to the use of a sensor of this type. Rather, in the case of the system described herein it is also possible not to provide any sensor.

Figure 6:
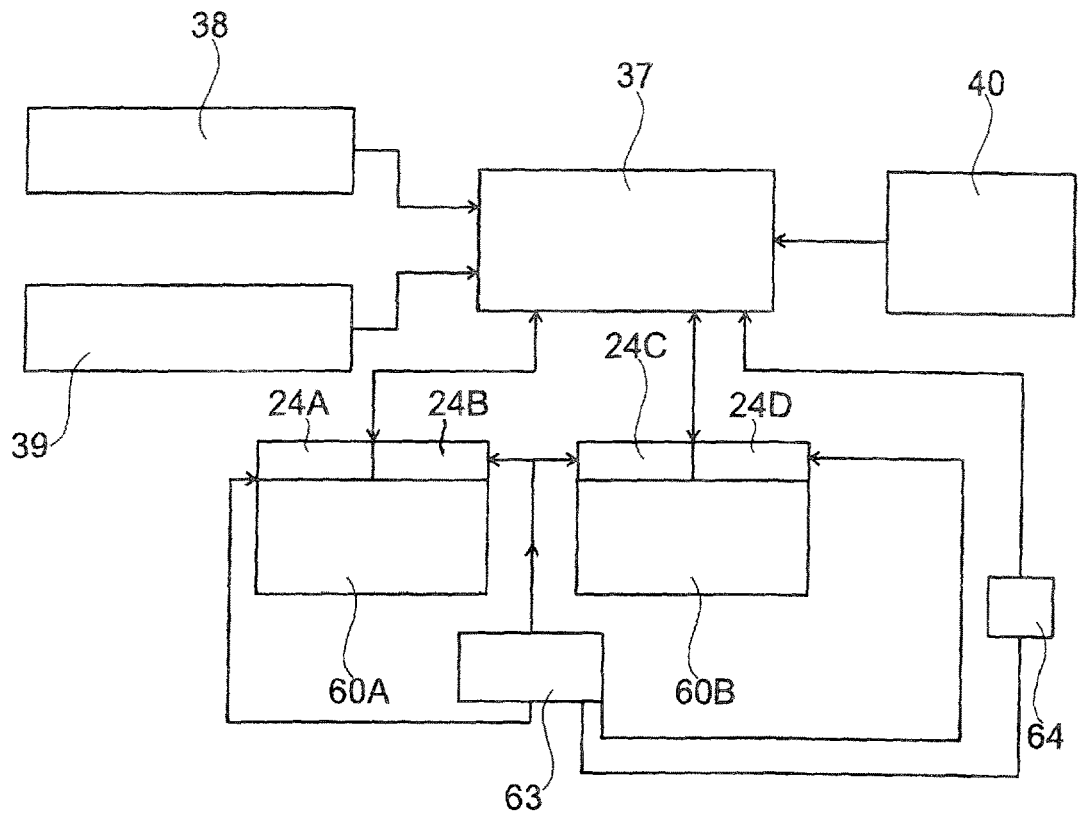
FIG. 6 shows a schematic illustration of a first block diagram of control and measuring units.

FIG. 6 shows a schematic illustration of a block diagram of control and measuring units for an image stabilization in the optical system in the form of the binoculars 1. The first cardan-type mount 60A of the first image stabilization unit 16A, the first drive unit 24A and the second drive unit 24B, which are arranged in the first housing part 2, on the one hand, and the second cardan-type mount 60B of the second image stabilization unit 16B, the third drive unit 24C and the fourth drive unit 24D, which are arranged in the second housing part 3, on the other hand, are connected to a control and supervision unit 37 (for example a microcontroller). The control and supervision unit 37 is in turn connected to a first angular velocity detector 38 and to a second angular velocity detector 39. The first angular velocity detector 38 serves for detecting movements of the binoculars 1 and is arranged in the first housing part 2. The second angular velocity detector 39 also serves for detecting movements of the binoculars 1 and is arranged in the first housing part 2. The abovementioned movements are, for example, rotational and/or translational trembling movements. Furthermore, the control and supervision unit 37 is connected to a folding bridge sensor 40. The background of the use of the folding bridge sensor 40 is as follows. The relative position of the axes of rotation (namely the first axis 18A and the second axis 19A of the first image stabilization unit 16A, on the one hand, and the third axis 18B and the fourth axis 19B of the second image stabilization unit 16B, on the other hand) changes during the setting of the interocular distance by means of the folding bridge 4. In order to be able to achieve an accurate setting of the rotary movement of the first image stabilization unit 16A relative to the second image stabilization unit 16B for image stabilization by positioning the first image stabilization unit 16A and the second image stabilization unit 16B, it is desirable to know the exact relative position of the respective axes of rotation. The folding bridge sensor 40 then determines a so-called folding bridge angle a between a first hinge part axis 72 of the first hinge part 5 and a second hinge part axis 73 of the second hinge part 6, wherein the first hinge part axis 72 and the second hinge part axis 73 have a common point of intersection with the articulation axis 74 (cf. FIGS. 2C and 2D). In this case, provision is made, for example, for determining the actual folding bridge angle a by means of the folding bridge sensor 40, which will be explained below. By way of example, the folding bridge angle a in FIG. 2C, in which the first axis 18A and the third axis 18B are arranged parallel to one another, can already be 175°. FIG. 2D then illustrates an orientation of the first hinge part axis 72 and of the second hinge part axis 73 in which the folding bridge angle a is 145°, for example. The actual folding bridge angle a with respect to the first axis 18A and the third axis 18B is then the difference between the two measured folding bridge angles, that is to say 30°. The folding bridge angle determined in this or a similar way then makes it possible to transform coordinates of a first coordinate system of structural units of the first housing part 2 into coordinates of a second coordinate system of structural units of the second housing part 3.

The position (rotary position) of the first image stabilization unit 16A and the position (rotary position) of the second image stabilization unit 16B are set for example in the manner outlined below. An angular velocity on account of a movement of the binoculars 1 relative to the observed surroundings is detected by means of the first angular velocity detector 38 and the second angular velocity detector 39. The first angular velocity detector 38 and the second angular velocity detector 39 supply angular velocity signals dependent on the movement. With the angular velocity signals, angles of rotation about the axes of rotation of the first image stabilization unit 16A (for example the first axis 18A and the second axis 19A), and angles of rotation about the axes of rotation of the second image stabilization unit 16B (for example the third axis 18B and the fourth axis 19B) are determined in the control and supervision unit 37. The angles of rotation determined in this way are then converted into first correction angles, by which the first image stabilization unit 16A has to be rotated in order to be positioned in space. Furthermore, the angles of rotation are used to calculate a second correction angle, by which the second image stabilization unit 16B has to be rotated in order to be "fixed" in space. Furthermore, it should be taken into consideration that the intersection point of the axes of rotation does not correspond to the optically neutral point of the binoculars 1. This means for example for the first optical subsystem 12 in the first housing part 2 that the first intersection point 20A of the first axis 18A and of the second axis 19A does not correspond to the optically neutral point of the binoculars 1 on the first optical axis 10. Therefore, the angle of rotation determined should be multiplied by a factor dependent on the binoculars 1 in order to obtain the necessary correction angle. In this case, the relative position of measurement axes of the two angular velocity detectors 38 and 39 and of the axes of rotation of the first image stabilization unit 16A and of the second image stabilization unit 16B should be taken into consideration. The corresponding correction angle is obtained by means of a suitable transformation. By way of example, provision is made for the position of the measurement axes of the two angular velocity detectors 38 and 39 to correspond to the position of the first axis 18A and of the second axis 19A of the first image stabilization unit 16A. By means of the folding bridge angle a determined, the angles of rotation of the first image stabilization unit 16A can then be transformed into angles of rotation of the second image stabilization unit 16B.

As is also evident from FIG. 6, the exemplary embodiment illustrated here has a voltage supply unit 63, which is connected to the first drive unit 24A, to the second drive unit 24B, to the third drive unit 24C and to the fourth drive unit 24D in order to supply the aforementioned drive units with voltage. The voltage supply unit 63 is embodied as a (rechargeable) battery, for example, the remaining voltage of which is measured by means of a voltage measuring unit 64. The voltage measuring unit is connected to the control and supervision unit 37.

Figure 7:
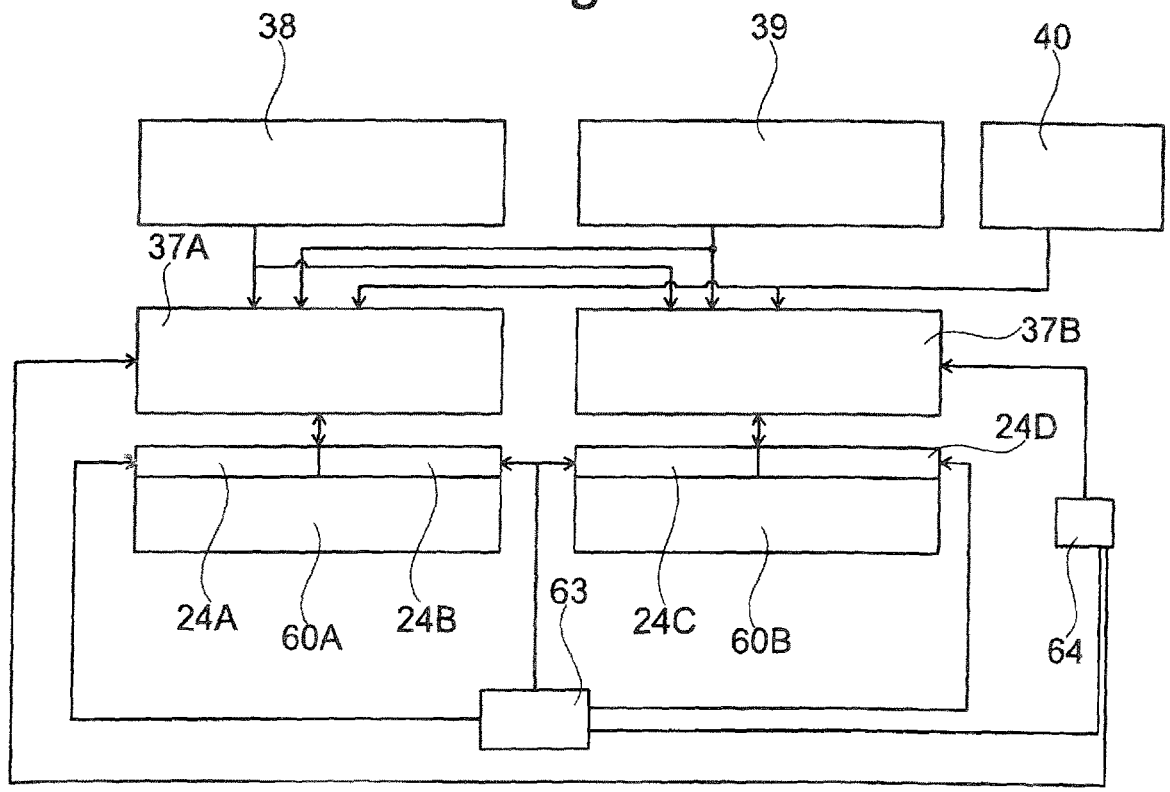
FIG. 7 shows a schematic illustration of a second block diagram of control and measuring units.

FIG. 7 is a block diagram of a further embodiment of control and measuring units, which is based on the exemplary embodiment in FIG. 6. Identical structural units are therefore provided with identical reference signs. In contrast to the embodiment in accordance with FIG. 6, the embodiment in accordance with FIG. 7 has two control and supervision units, namely a first control and supervision unit 37A and a second control and supervision unit 37B. The first control and supervision unit 37A is connected to the first angular velocity detector 38, to the first cardan-type mount 60A of the first image stabilization unit 16A, to the first drive unit 24A and to the second drive unit 24B. The first control and supervision unit 37A is arranged in the first housing part 2, for example. The second control and supervision unit 37B is connected to the second angular velocity detector 39, to the second cardan-type mount 60B of the second image stabilization unit 16B, to the third drive unit 24C and to the fourth drive unit 24D. The second control and supervision unit 37B is arranged in the second housing part 3, for example. The folding bridge sensor 40 is connected both to the first control and supervision unit 37A and to the second control and supervision unit 37B. Furthermore, the first angular velocity detector 38 is connected to the second control and supervision unit 37B. Furthermore, the second angular velocity detector 39 is connected to the first control and supervision unit 37A. This exemplary embodiment accordingly uses in each case a separate control and supervision unit on the one hand for the first optical subsystem 12 in the first housing part 2 and on the other hand for the second optical subsystem 13 in the second housing part 3, although the angular velocity detectors 38, 39 are used jointly for detecting movements of the binoculars 1. The voltage measuring unit 64 is connected both to the first control and supervision unit 37A and to the second control and supervision unit 37B.

Figure 8:
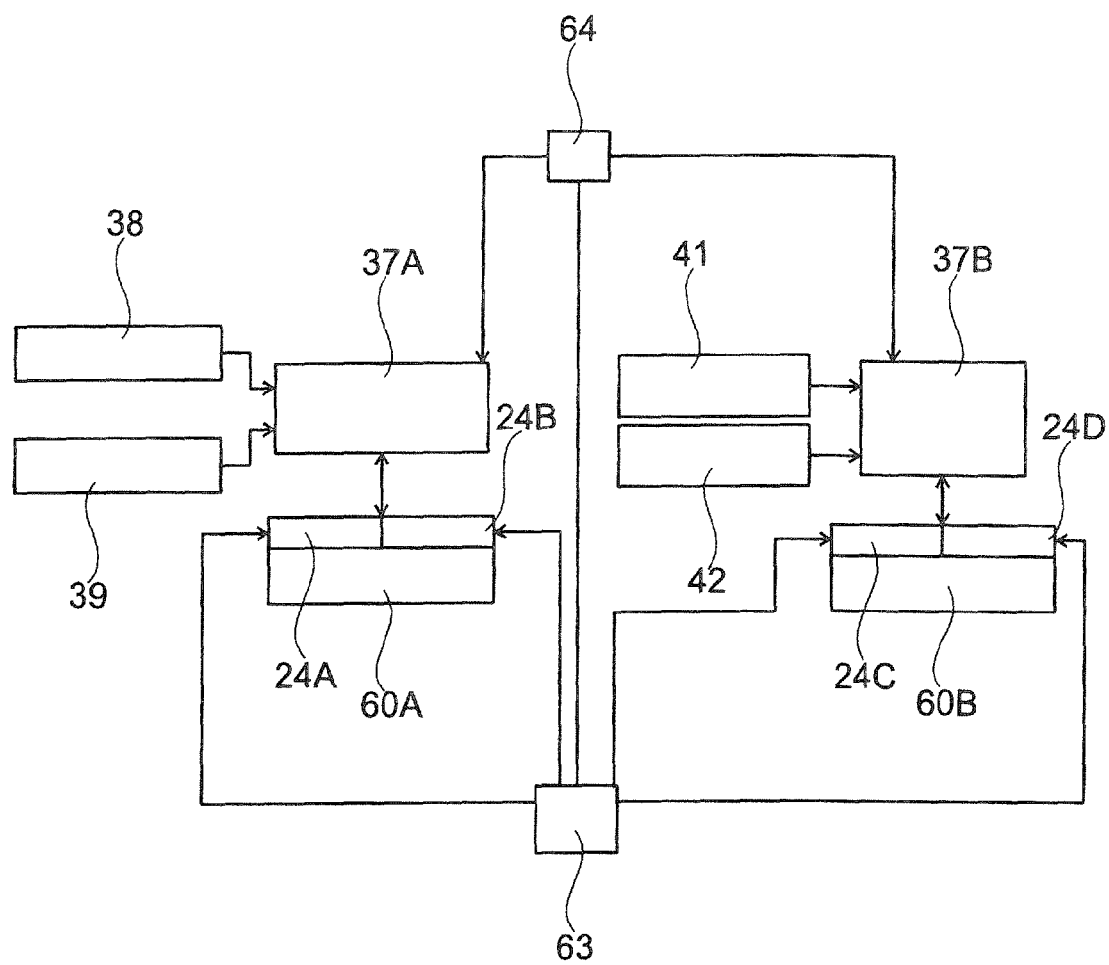
FIG. 8 shows a schematic illustration of a third block diagram of control and measuring units.

FIG. 8 shows a block diagram of a further exemplary embodiment of an arrangement of control and measuring units. The exemplary embodiment in FIG. 8 is based on the exemplary embodiment in FIG. 6. Identical structural units are provided with identical reference signs. In this exemplary embodiment, provision is made for a separate control unit to be provided for each of the two housing parts 2 and 3 mentioned above. Thus, the first image stabilization unit 16A, the first cardan-type mount 60A, the first drive unit 24A, the second drive unit 24B and the first control and supervision unit 37A are arranged in the first housing part 2. The first control and supervision unit 37A is connected to the first angular velocity detector 38 and to the second angular velocity detector 39, which are likewise arranged in the first housing part 2. By contrast, the second image stabilization unit 16B, the second cardan-type mount 60B, the third drive unit 24C, the fourth drive unit 24D and the second control and supervision unit 37B are arranged in the second housing part 3. Furthermore, a third angular velocity detector 41 and a fourth angular velocity detector 42, which determine the movements of the binoculars 1, are arranged in the second housing part 3. The voltage measuring unit 64 is connected both to the first control and supervision unit 37A and to the second control and supervision unit 37B.

A further embodiment of the invention provides for at least one of the angular velocity detectors above and/or below to be replaced by an acceleration detector. The velocity is then likewise obtained by integration over a predefineable time.

FIG. 9 is based on FIG. 1B. Identical structural parts are provided with identical reference signs. In addition to the exemplary embodiment in FIG. 1B, the exemplary embodiment in FIG. 9 has sensors 65 to 70, the function of which is explained below. Furthermore, a further function of the voltage measuring unit 64 is also explained.

In principle, the voltage measuring unit 64 and the sensors to 70 serve to control the energy consumption of the abovementioned drive units 24A to 24D and to limit it in such a way that only the energy actually required in a given situation is consumed. An image stabilization by movement of the first image stabilization unit 16A and of the second image stabilization unit 16B is intended to be effected, for example, only when a user also actually uses the binoculars 1. Furthermore, in the case of the binoculars 1, provision is made for the extent and the quality of the image stabilization to be adapted to the available energy. Furthermore, in the case of the binoculars 1, provision is made for the quality of the image stabilization to be adapted to the observation situation. By way of example, a very high-quality image stabilization is not absolutely necessary when the binoculars 1 are used in darkness or in the case of a very small magnification.

In particular, provision is made for the voltage measuring unit 64 already described above always to measure the voltage still available from the voltage supply unit 63.

If it is recognized that the voltage supply unit 63 can make available only a low energy, for example the maximum angle of rotation by which the first image stabilization unit 16A and/or the second image stabilization unit 16B are/is rotated is limited. The movements of the two image stabilization units 16A and 16B mentioned above become shorter and/or slower as a result. The energy consumption is reduced as a result.

In a further embodiment it is provided that—if it is recognized that the voltage supply unit 63 can make available only a low energy—low-frequency and/or high-frequency components of a movement of the binoculars 1 (for example a trembling movement) are no longer taken into account in the image stabilization. Low-frequency components of a movement have hardly any effect on detail identifiability. The low-frequency components are relatively large movements, such that the power consumption of the abovementioned drive units 24A to 24D is reduced if the low-frequency components are no longer taken into account in the image stabilization. As already explained above, the energy consumption decreases if high-frequency components are also dispensed with in the image stabilization.

Furthermore, this exemplary embodiment of the binoculars 1 provides for generally reducing the amplitude of a movement of at least one of the two image stabilization units 16A and 16B mentioned above if the voltage supply unit 63 can make available only a certain energy. Additionally or alternatively, provision is made for the speed at which at least one of the two image stabilization units 16A and 16B is moved to be limited to a maximum speed. The power consumption of the corresponding drive units 24A to 24D of the respective image stabilization unit 16A and 16B decreases as a result.

The binoculars 1 have a brightness sensor 65 arranged on the folding bridge 4 and serving for determining the ambient brightness. In darkness, the perception of a user of the binoculars 1 is no longer very fast. In darkness, movements of the binoculars 1 are no longer perceived in such a way that they are found to be disturbing. In darkness, the control and supervision unit 37, the first control and supervision unit 37A or the second control and supervision unit 37B therefore switches to a night mode. The image stabilization is completely switched off. As an alternative thereto, provision is made for limiting the angle of rotation of the first image stabilization unit 16A and/or of the second image stabilization unit 16B. Alternatively, provision is also made for moving the first image stabilization unit 16A or the second image stabilization unit 16B only upon a first limit frequency being exceeded and/or a second limit frequency being undershot. In this way, high-frequency components and/or low-frequency components of the movement of the binoculars 1 are not taken into account in the image stabilization. Moreover, provision can then be made for limiting the speed of movement of the first image stabilization unit 16A and/or of the second image stabilization unit 16B.

The binoculars 1 furthermore have a position sensor 66 arranged on the folding bridge 4 and serving for determining an inclination of the binoculars 1. By means of the position sensor 66 it is possible to determine the position of the optical axes 10 and 11 of the binoculars 1 in space. If an excessively large deviation (for example a deviation of the optical axes 10 and 11 by 70° to 100° with respect to the horizontal) is ascertained, then it can be assumed that the binoculars 1 are not being used. In this case, the control and supervision unit 37, the first control and supervision unit 37A or the second control and supervision unit 37B therefore switches off the image stabilization of the binoculars 1.

Furthermore, the binoculars 1 are provided with a sensor 67 for identifying a monocular application of the binoculars 1. This sensor 67 is arranged for example on the second housing part 3 in the region of the second objective 16B. However, the system described herein is not restricted to this type of arrangement. Rather, the sensor 67 can be arranged at any location of the binoculars 1 which is suitable for this purpose. If a so-called optical booster is arranged on the second housing part 3, this is identified by means of the sensor 67. In this case, the control and supervision unit 37, the first control and supervision unit 37A or the second control and supervision unit 37B therefore switches off the image stabilization of the binoculars 1.

The binoculars 1 furthermore have, in the region of the first eyepiece 17A and of the second eyepiece 17B, a respective eye sensor 68 for identifying the eyes 15A, 15B of a user. By way of example, a photosensor for measuring the light at the first eyepiece 17A and/or at the second eyepiece 17B is suitable as eye sensor 68. Still further exemplary embodiments provide a capacitance measurement. If no eye is situated at the first eyepiece 17A and the second eyepiece 17B, then the control and supervision unit 37, the first control and supervision unit 37A or the second control and supervision unit 37B therefore switches off the image stabilization of the binoculars 1.

On the binoculars, a respective protective cap sensor 69 is arranged in the region of the first objective 14A, of the second objective 14B, of the first eyepiece 17A and of the second eyepiece 17B, and serves for identifying an arrangement of an objective protective cap and/or eyepiece protective cap. If a protective cap is arranged on the first objective 14A, the second objective 14B, the first eyepiece 17A and/or the second eyepiece 17B, it can be assumed that the binoculars 1 are not being used. The control and supervision unit 37, the first control and supervision unit 37A or the second control and supervision unit 37B then switches off the image stabilization of the binoculars 1.

A respective hand sensor 70 is arranged both on the first housing part 2 and on the second housing part 3 of the binoculars 1. The hand sensors 70 serve for identifying an arrangement of a hand of a user on the binoculars 1. By way of example, a capacitive sensor (capacitance measurement), a photosensor or a pressure sensor is used as hand sensor 70. If it is recognized that no hand is touching the binoculars 1, then it can be assumed that the binoculars 1 are not being used. The control and supervision unit 37, the first control and supervision unit 37A or the second control and supervision unit 37B then switches off the image stabilization of the binoculars 1.

The folding bridge sensor 40 can also be concomitantly used for optimizing the energy consumption. The fact of whether a minimum folding bridge angle a of the folding bridge 4 is present is ascertained by means of the folding bridge sensor 40. If the minimum folding bridge angle a is set, it can be assumed that the binoculars 1 are being transported. The control and supervision unit 37, the first control and supervision unit 37A or the second control and supervision unit 37B then switches off the image stabilization of the binoculars 1.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An optical system for imaging an object, comprising:
at least one first objective;
at least one first image stabilization unit that is rotated to provide image stabilization;
at least one first image plane;
at least one second objective;
at least one second image stabilization unit;
at least one second image plane;
a first housing, wherein the at least one first objective, the at least one first image stabilization unit and the at least one first image plane are arranged in the first housing, wherein the at least one first image stabilization unit is arranged with a first cardan-type mounting in the first housing and is embodied as a first prism erecting system; and
a second housing, wherein the at least one second objective, the at least one second image stabilization unit and the at least one second image plane are arranged in the second housing, wherein the at least one second image stabilization unit is arranged with a second cardan-type mounting in the second housing and is embodied as a second prism erecting system such that the first cardan-type mounting and the second cardan-type mounting are different units and are arranged in different housings,
wherein as viewed from the at least one first objective in the direction of the at least one first image plane, firstly the at least one first objective, then the at least one first image stabilization unit and then the at least one first image plane are arranged along a first optical axis, wherein the at least one first image stabilization unit has at least one first entrance surface and at least one first exit surface, wherein the at least one first entrance surface is directed toward the at least one first objective, wherein the at least one first exit surface is directed toward the at least one first image plane, and wherein the at least one first exit surface is arranged at a distance in a range of 1 mm to 20 mm from the at least one first image plane, wherein, as viewed from the at least one second objective, in the direction of the at least one second image plane, firstly the at least one second objective, then the at least one second image stabilization unit, and then the at least one second image plane are arranged along a second optical axis, wherein the at least one second image stabilization unit has at least one second entrance surface and at least one second exit surface, wherein the at least one second entrance surface is directed toward the at least one second objective, wherein the at least one second exit surface is directed toward the at least one second image plane, and wherein the at least one second exit surface is arranged at a distance in a range of 1 mm to 20 mm from the at least one second image plane, wherein the first housing is connected to the second housing via a folding bridge, wherein the folding bridge has a first hinge part arranged on the first housing, and wherein the folding bridge has a second hinge part arranged on the second housing, wherein the first hinge part and the second hinge part are connected via an axial pin, wherein the optical system is binoculars, wherein the first cardan-type mounting includes:
 a first outer suspension which is arranged in the first housing via a first axis and which is rotatable about the first axis, and
 a first inner suspension which is arranged in the first outer suspension via a second axis and which is rotatable around the second axis, wherein the second cardan type-mounting includes:
 a second outer suspension which is arranged in the second housing via a third axis and which is rotatable about the third axis, and
 a second inner suspension which is arranged in the second outer suspension via a fourth axis and which is rotatable around the fourth axis, and wherein the first outer suspension is different than the second outer suspension, the first inner suspension is different than the second inner suspension, and the second axis is different than the fourth axis.

2. The optical system according to claim 1, further comprising one of the following features:
 (i) the at least one first exit surface is arranged at a distance in a range of 2 mm to 15 mm from the at least one first image plane, or
 (ii) the at least one first exit surface is arranged at a distance in a range of 3 mm to 12 mm from the at least one first image plane.

3. The optical system according to claim 1, wherein the at least one first image stabilization unit is embodied in a movable fashion.

4. The optical system according to claim 1, further comprising one of the following features:
 (i) a first image acquisition unit arranged in the at least one first image plane;
 (ii) a first image acquisition unit arranged in the at least one first image plane, wherein the first image acquisition unit is embodied as a semiconductor-based sensor; or
 (iii) at least one first eyepiece, wherein firstly the at least one first image plane and then the at least one first eyepiece are arranged as viewed from the at least one first objective in the direction of the at least one first image plane.

5. The optical system according to claim 1, further comprising:
 at least one first eyepiece, wherein firstly the at least one first image plane and then the at least one first eyepiece are arranged as viewed from the at least one first objective in the direction of the at least one first image plane, and wherein the at least one first eyepiece is arranged in the first housing.

6. The optical system according to claim 1, further comprising one of the following features:
 (i) the at least one second exit surface is arranged at a distance in a range of 2 mm to 15 mm from the at least one second image plane; or
 (ii) the at least one second exit surface is arranged at a distance in a range of 3 mm to 12 mm from the at least one second image plane.

7. The optical system according to claim 1, wherein the at least one second image stabilization unit is embodied in a movable fashion.

8. The optical system according to claim 1, further comprising one of the following features:
 (i) a second image acquisition unit arranged in the at least one second image plane;
 (ii) a second image acquisition unit embodied as a semiconductor-based sensor and arranged in the at least one second image plane; or
 (iii) at least one second eyepiece, wherein firstly the at least one second image plane and then the at least one second eyepiece are arranged as viewed from the at least one second objective in the direction of the at least one second image plane.

9. The optical system according to claim 1, further comprising:
 at least one second eyepiece, wherein firstly the at least one second image plane and then the at least one second eyepiece are arranged as viewed from the at least one second objective in the direction of the at least one second image plane, and wherein the at least one second eyepiece is arranged in the second housing.

10. The optical system according to claim 1, further comprising at least one of the following features:
 (i) the at least one first image stabilization unit is arranged in the first housing in a manner rotatable about the first axis and about the second axis, wherein the first axis and the second axis intersect at a first intersection point, which differs from a first optical neutral point on the first optical axis and which is arranged on the first optical axis;
 (ii) at least one first drive unit for moving the at least one first image stabilization unit;
 (iii) at least one first drive unit for moving the at least one first image stabilization unit, wherein the first drive unit comprises at least one first piezo-ceramic;
 (iv) at least one first drive unit for moving the at least one first image stabilization unit, wherein the at least one first drive unit comprises at least one first piezo-actuator;
 (v) at least one first drive unit for moving the at least one first image stabilization unit, wherein the at least one first drive unit comprises at least one first piezo-bending actuator; or (vi) at least one first drive unit for moving the at least one first image stabilization unit and at least one first control unit for controlling the at least one first drive unit.

11. The optical system according to claim 1, further comprising at least one of the following features:
    (i) the at least one second image stabilization unit is arranged in the second housing in a manner rotatable about the third axis and about the fourth axis, wherein the third axis and the fourth axis intersect at a second intersection point, which differs from a second optical neutral point on the second optical axis and which is arranged on the second optical axis;
    (ii) at least one second drive unit for moving the at least one second image stabilization unit;
    (iii) at least one second drive unit for moving the at least one second image stabilization unit, wherein the second drive unit comprises at least one second piezo-ceramic;
    (iv) at least one second drive unit for moving the at least one second image stabilization unit, wherein the at least one second drive unit comprises at least one second piezo-actuator;
    (v) at least one second drive unit for moving the at least one second image stabilization unit, wherein the at least one second drive unit comprises at least one second piezo-bending actuator; or
    (vi) at least one second drive unit for moving the at least one second image stabilization unit and at least one second control unit for controlling the at least one second drive unit.

12. The optical system according to claim 1, further comprising:
    at least one control unit for controlling a first drive unit for moving the at least one first image stabilization unit and a second drive unit for moving the at least one second image stabilization unit.

13. The optical system according to claim 1, further comprising at least one of the following features:
    (i) at least one motion detector for determining a motion of the optical system;
    (ii) at least one first motion detector for determining a motion of the optical system and at least one second motion detector for determining a motion of the optical system;
    (iii) at least one stabilization detector for determining a motion of the at least one first image stabilization unit and/or of the at least one second image stabilization unit; or
    (iv) at least one first stabilization detector for determining a motion of the at least one first image stabilization unit and at least one second stabilization detector for determining a motion of the at least one second image stabilization unit.

14. The optical system according to claim 1, wherein the first housing is embodied as a tube.

15. The optical system according to claim 1, wherein the second housing is embodied as a tube.

16. An optical system for imaging an object, comprising:
    at least one first objective;
    at least one first image plane;
    at least one second objective;
    at least one second image plane, wherein the at least one first objective and the at least one first image plane are arranged in a first housing, and wherein the at least one second objective and the at least one second image plane are arranged in a second housing;
    at least one first image stabilization unit arranged in the first housing;
    at least one second image stabilization unit arranged in the second housing;
    at least one first drive unit for moving the at least one first image stabilization unit;
    at least one second drive unit for moving the at least one second image stabilization unit; and
    at least one measuring device for measuring the voltage of a voltage supply unit for supplying a voltage to the at least one first drive unit and at least one control unit, wherein the at least one control unit is designed with regard to moving the at least one first image stabilization unit for image stabilization upon a first limit frequency being exceeded and/or a second limit frequency being undershot,
    wherein the first limit frequency and the second limit frequency are frequencies of movement of the optical system.

17. The optical system according to claim 16, further comprising at least one of the following features:
    (i) the at least one first drive unit is embodied as a piezo-actuator; or
    (ii) the at least one second drive unit is embodied as a piezo-actuator.

18. The optical system according to claim 16, wherein the at least one first drive unit is arranged in the first housing, and wherein the at least one second drive unit is arranged in the second housing.

19. The optical system according to claim 16, wherein the at least one control unit is designed with regard to at least one of the following properties:
    (i) limiting an angle of rotation of the at least one second image stabilization unit;
    (ii) moving the at least one second image stabilization unit upon a first limit frequency being exceeded and/or a second limit frequency being undershot; or
    (iii) limiting a speed of motion of the at least one second image stabilization unit.

20. The optical system according to claim 16, further comprising at least one of the following features:
    (i) at least one brightness sensor for determining the ambient brightness and at least one system control unit for limiting an angle of rotation of the at least one first image stabilization unit and/or of the at least one second image stabilization unit, and/or for moving the at least one first image stabilization unit or the at least one second image stabilization unit upon a first limit frequency being exceeded and/or a second limit frequency being undershot, and/or for limiting a speed of motion of the at least one first image stabilization unit and/or of the at least one second image stabilization unit;
    (ii) at least one position sensor for determining an inclination of the optical system and at least one system control unit for switching off an image stabilization at the optical system;
    (iii) at least one sensor for identifying a monocular application of the optical system and at least one system control unit for switching off an image stabilization at the optical system;
    (iv) at least one sensor for identifying an eye of a user and at least one system control unit for switching off an image stabilization at the optical system;
    (v) at least one sensor for identifying an arrangement of an objective protective cap and/or eyepiece protective cap and at least one system control unit for switching off an image stabilization at the optical system;
(vi) at least one sensor for identifying an arrangement of a hand of a user and at least one system control unit for switching off an image stabilization at the optical system; or
(vii) at least one sensor for identifying a minimum folding angle of the folding bridge and at least one system control unit for switching off an image stabilization at the optical system.

21. The optical system according to claim 1, wherein the at least one first objective includes a focusing unit.

22. The optical system according to claim 16, wherein the at least one first objective includes a focusing unit.

23. An optical system for imaging an object, comprising:
at least one first objective;
at least one first image stabilization unit that is rotated to provide image stabilization;
at least one first image plane;
at least one second objective;
at least one second image stabilization unit;
at least one second image plane;
a first housing, wherein the at least one first objective, the at least one first image stabilization unit and the at least one first image plane are arranged in the first housing, wherein the at least one first image stabilization unit is arranged in the first housing in a manner rotatable about a first axis and about a second axis, wherein the first axis and the second axis intersect at a first intersection point, which differs from a first optical neutral point on the first optical axis and which is arranged on the first optical axis, wherein the first optical neutral point is a point about which the at least one first objective and a first eyepiece within the first housing are rotatable relatively in space without a position of an image of an object being shifted while the at least one first image stabilization unit remains fixed in space; and
a second housing, wherein the at least one second objective, the at least one second image stabilization unit and the at least one second image plane are arranged in the second housing,
wherein as viewed from the at least one first objective in the direction of the at least one first image plane, firstly the at least one first objective, then the at least one first image stabilization unit and then the at least one first image plane are arranged along a first optical axis, wherein the at least one first image stabilization unit has at least one first entrance surface and at least one first exit surface, wherein the at least one first entrance surface is directed toward the at least one first objective, wherein the at least one first exit surface is directed toward the at least one first image plane, and wherein the at least one first exit surface is arranged at a distance in a range of 1 mm to 20 mm from the at least one first image plane,
wherein, as viewed from the at least one second objective, in the direction of the at least one second image plane, firstly the at least one second objective, then the at least one second image stabilization unit, and then the at least one second image plane are arranged along a second optical axis, wherein the at least one second image stabilization unit has at least one second entrance surface and at least one second exit surface, wherein the at least one second entrance surface is directed toward the at least one second objective, wherein the at least one second exit surface is directed toward the at least one second image plane, and wherein the at least one second exit surface is arranged at a distance in a range of 1 mm to 20 mm from the at least one second image plane,
wherein the first housing is connected to the second housing via a folding bridge, wherein the folding bridge has a first hinge part arranged on the first housing, and wherein the folding bridge has a second hinge part arranged on the second housing, and
wherein the first hinge part and the second hinge part are connected via an axial pin.

24. The optical system according to claim 23, wherein the first axis and the second axis intersect at the center of gravity of the first image stabilization unit.

* * * * *